United States Patent
Chow et al.

(10) Patent No.: US 7,660,938 B1
(45) Date of Patent: Feb. 9, 2010

(54) FLASH CARD READER AND DATA EXCHANGER UTILIZING LOW POWER EXTENDED USB PROTOCOL WITHOUT POLLING

(75) Inventors: David Q. Chow, San Jose, CA (US);
Sidney Young, Hsin Chu (TW);
Abraham C. Ma, Fremont, CA (US);
Ming-Shiang Shen, Taipei (TW)

(73) Assignee: Super Talent Electronics, Inc., San Jose, CA (US)

( * ) Notice: Subject to any disclaimer, the term of this patent is extended or adjusted under 35 U.S.C. 154(b) by 21 days.

(21) Appl. No.: 11/929,414

(22) Filed: Oct. 30, 2007

Related U.S. Application Data

(63) Continuation-in-part of application No. 11/623,863, filed on Jan. 17, 2007, which is a continuation-in-part of application No. 10/956,826, filed on Oct. 1, 2004, now Pat. No. 7,299,316, said application No. 11/929, 414 is a continuation-in-part of application No. 11/925,933, filed on Oct. 27, 2007, and a continuation-in-part of application No. 11/864,696, filed on Sep. 28, 2007.

(51) Int. Cl.
G06F 13/00 (2006.01)
G06F 12/00 (2006.01)
(52) U.S. Cl. .................... 710/313; 711/115
(58) Field of Classification Search ........ 711/115; 710/313, 314, 315, 301, 302, 316
See application file for complete search history.

(56) References Cited

U.S. PATENT DOCUMENTS

| | | |
|---|---|---|
| 5,623,552 A | 4/1997 | Lane |
| 5,907,856 A | 5/1999 | Estakhri et al. |
| 5,959,541 A | 9/1999 | DiMaria et al. |
| 6,000,006 A | 12/1999 | Bruce et al. |
| 6,012,636 A | 1/2000 | Smith |
| 6,069,920 A | 5/2000 | Schulz et al. |
| 6,081,858 A | 6/2000 | Abudayyeh et al. |
| 6,125,192 A | 9/2000 | Bjorn et al. |
| 6,193,152 B1 | 2/2001 | Fernando et al. |
| 6,202,138 B1 | 3/2001 | Estakhri et al. |
| 6,230,233 B1 | 5/2001 | Lofgren et al. |
| 6,275,894 B1 | 8/2001 | Kuo et al. |
| 6,321,478 B1 | 11/2001 | Klebes |
| 6,547,130 B1 | 4/2003 | Shen |
| 6,636,929 B1 | 10/2003 | Frantz et al. |
| 6,718,407 B2 | 4/2004 | Martwick |

(Continued)

*Primary Examiner*—Glenn A Auve
(74) *Attorney, Agent, or Firm*—Blakely Sokoloff Taylor & Zafman LLP

(57) ABSTRACT

A portable universal serial bus (USB) data exchanger device is described herein. In one embodiment, the portable USB data exchanger includes at least one flash memory chip having a multi-level cell (MLC) memory array, a flash memory controller coupled to the at least one flash memory chip, the flash memory controller having a USB on-the-go (OTG) capability and controlling reading and writing of the flash memory chip, a first extended USB (EUSB) connector coupled to the flash memory controller to be coupled to a host, and a second EUSB connector coupled to the flash memory controller to be coupled to a slave USB device. The Portable USB data exchanger can communicate with either a host or a slave USB device without polling. Other methods and apparatuses are also described.

10 Claims, 35 Drawing Sheets

U.S. PATENT DOCUMENTS

| | | |
|---|---|---|
| 6,880,024 B2 | 4/2005 | Chen et al. |
| 7,000,057 B1 * | 2/2006 | Novell et al. .................. 710/306 |
| 7,103,765 B2 | 9/2006 | Chen |
| 7,214,089 B1 * | 5/2007 | Learmonth et al. .......... 439/441 |
| 7,249,978 B1 | 7/2007 | Ni |
| 7,257,714 B1 | 8/2007 | Shen |
| 2001/0043174 A1 | 11/2001 | Jacobsen et al. |
| 2002/0166023 A1 | 11/2002 | Nolan et al. |
| 2003/0046510 A1 | 3/2003 | North |
| 2003/0163656 A1 | 8/2003 | Ganton |
| 2004/0148482 A1 | 7/2004 | Grundy et al. |
| 2004/0255054 A1 | 12/2004 | Pua et al. |
| 2005/0102444 A1 | 5/2005 | Cruz |
| 2005/0120146 A1 | 6/2005 | Chen et al. |
| 2005/0160213 A1 | 7/2005 | Chen |
| 2005/0182881 A1 * | 8/2005 | Chou et al. .................. 710/301 |
| 2005/0193161 A1 | 9/2005 | Lee et al. |
| 2005/0246243 A1 | 11/2005 | Adams et al. |
| 2005/0262279 A1 * | 11/2005 | Overtoom .................... 710/62 |
| 2005/0268082 A1 | 12/2005 | Poisner |
| 2006/0065743 A1 | 3/2006 | Fruhauf |
| 2006/0075174 A1 | 4/2006 | Vuong |
| 2006/0106962 A1 | 5/2006 | Woodbridge et al. |
| 2006/0161725 A1 | 7/2006 | Lee et al. |
| 2006/0206702 A1 | 9/2006 | Fausak |
| 2006/0242395 A1 | 10/2006 | Fausak |
| 2006/0288147 A1 * | 12/2006 | Hsieh ........................ 710/305 |
| 2007/0094489 A1 | 4/2007 | Ota et al. |
| 2007/0113067 A1 | 5/2007 | Oh et al. |
| 2007/0113267 A1 | 5/2007 | Iwanski et al. |
| 2007/0130436 A1 | 6/2007 | Shen |
| 2008/0022029 A1 * | 1/2008 | Chang et al. ................. 710/301 |
| 2008/0059679 A1 * | 3/2008 | Zhang et al. ................. 710/301 |
| 2008/0282014 A1 * | 11/2008 | Pan et al. .................... 710/313 |
| 2008/0282092 A1 * | 11/2008 | Pan et al. .................... 713/186 |

* cited by examiner

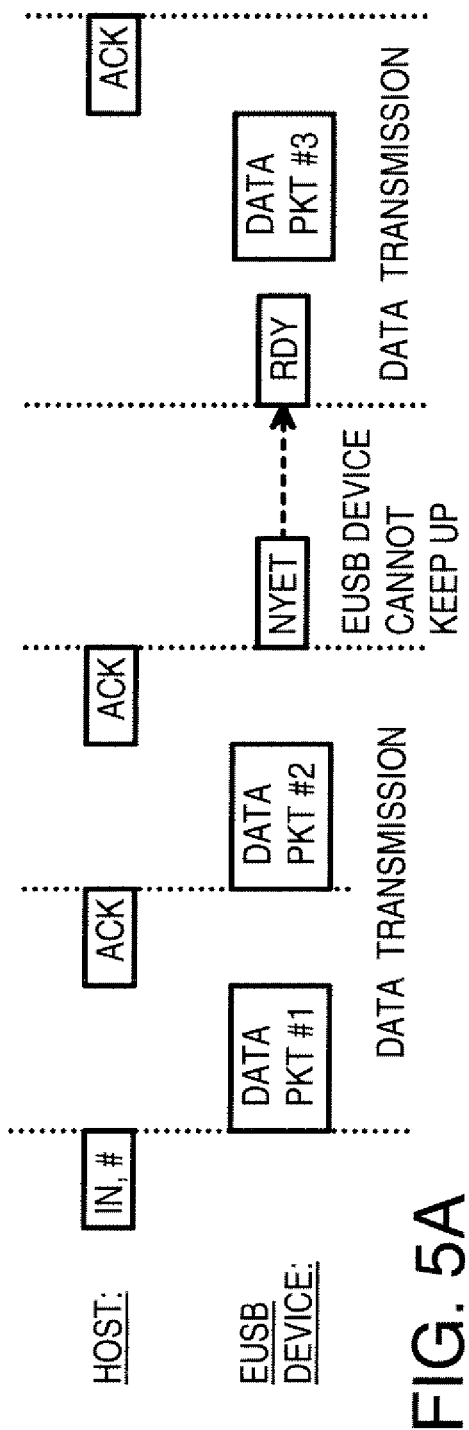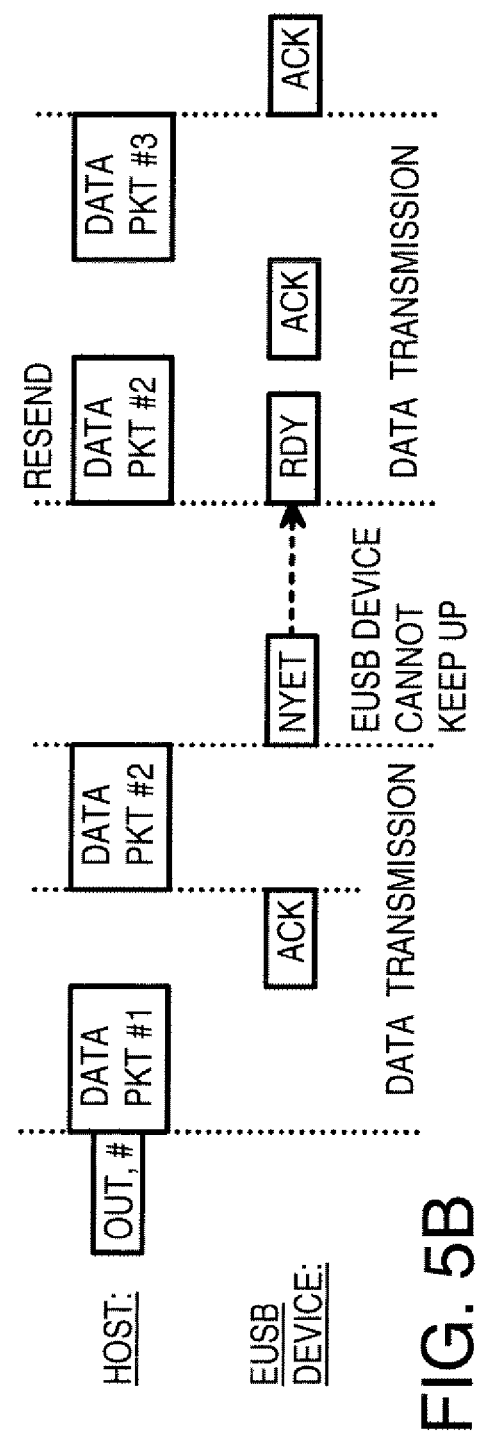

FLASH CARD READER AND DATA EXCHANGER UTILIZING LOW POWER EXTENDED USB PROTOCOL WITHOUT POLLING

RELATED APPLICATIONS

This application is also a CIP of U.S. patent Ser. No. 11/623,863, filed Jan. 17, 2007, entitled "Secure Flash-Memory Card Reader with Host-Encrypted Data on a Flash-Controller-Mastered Bus Parallel to a Local CPU Bus Carrying Encrypted Hashed Password and User ID", which is a CIP of application Ser. No. 10/956,826, filed Oct. 1, 2004, entitled "USB Card Reader".

This application is also a CIP of U.S. patent application Ser. No. 11/925,933, filed Oct. 27, 2007, entitled "Low Power Extended USB Device without a Polling", which is related to "Flash memory device and architecture with multi level cells", U.S. Ser. No. 10/800,228, filed Mar. 12, 2004, now U.S. Pat. No. 7,082,056, and "Flash Drive/Reader with Serial-port Controller and Flash-Memory Controller Mastering a Second RAM-buffer Bus Parallel to a CPU Bus", U.S. Ser. No. 10/605,140, filed Sep. 10, 2003, now U.S. Pat. No. 6,874,044.

This application is also a CIP of U.S. patent application Ser. No. 11/864,696, filed Sep. 28, 2007, entitled "Backward Compatible Extended-MLC USB Plug and Receptacle with Dual Personality".

The disclosure of the above-identified applications and patents is incorporated by reference herein in its entirety.

FIELD OF THE INVENTION

The present invention relates generally to extended Universal-Serial Bus (USB) systems, and more particularly to lower-power USB protocol extensions that reduce power.

BACKGROUND

A great variety of small portable devices such as personal digital assistants (PDA), multi-function cell phones, digital cameras, music players, etc. have become widely available. These devices use a central processing unit (CPU) or micro-controller and a mass-storage memory such as a hard drive or flash memory. These small devices are often cost and size sensitive.

These small portable electronic devices often are able to connect to a host computer such as a personal computer (PC). While a proprietary connector may be used, a connector for a standard expansion bus is preferable. Universal-Serial Bus (USB) is often used to connect such portable flash-memory card reader or Data Exchanger to a PC. USB uses one pair of differential lines that are time-duplexed, or used for transmission in both directions, but at different times. This may limit performance when data needs to be sent in both directions at the same time. The current USB 2.0 standard provides that the host, such as the PC, controls the bus as the bus master, while USB devices plugged into the host act as slave devices. A USB controller on the host PC generates data transfer transactions and waits for USB devices to respond, either by transmitting requested data to the host, or by writing host data into the USB device's memory.

Since memory on a USB device may be busy or slow, sometimes the host's request cannot be processed immediately. The host may send the request, then periodically poll the USB device to see whether the data is ready. Also, when the host is idle, the host may need to periodically poll the USB device to see if the USB device needs to transfer information to the host. This periodic polling may be used for other purposes as well, such as presence or removal of flash cards from the Card Reader device.

While polling is useful, since it allows the host to completely control the USB bus, power is consumed each time a packet is sent for polling. While this power is small, for low-power or battery-powered devices, the amount of power consumed may be significant and undesirable. Also, the USB device or host may otherwise be in a low-power sleep or suspend state, and have to wake up into a higher-power state to perform or respond to the polling. There may be significant time and energy required to wake up from the suspend or sleep state, and then to re-enter the suspend or sleep state once polling is done.

What is desired is a USB device and USB host that have lower power. A USB system that does not require polling is desirable. Bus protocols and transactions that avoid polling are desirable to be applied to USB to reduce energy consumed by polling.

SUMMARY OF THE DESCRIPTION

A portable universal serial bus (USB) data exchanger device is described herein. In one embodiment, the portable USB data exchanger includes at least one flash memory chip having a multi-level cell (MLC) memory array, a flash memory controller coupled to the at least one flash memory chip, the flash memory controller having a USB on-the-go (OTG) capability and controlling reading and writing of the flash memory chip, a first extended USB (EUSB) connector coupled to the flash memory controller to be coupled to a host, and a second EUSB connector coupled to the flash memory controller to be coupled to a slave USB device. The Portable USB data exchanger can operate either as slave USB device with respect to an external host coupled to the first EUSB connector or alternatively, as a host with respect to an external slave USB device coupled to the second EUSB connector. The Portable USB data exchanger can communicate with either a host or a slave USB device without polling.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

FIGS. 5A-5B are timeline diagrams associated operations of FIGS. 3-4.

DETAILED DESCRIPTION

In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

Figure 1A:
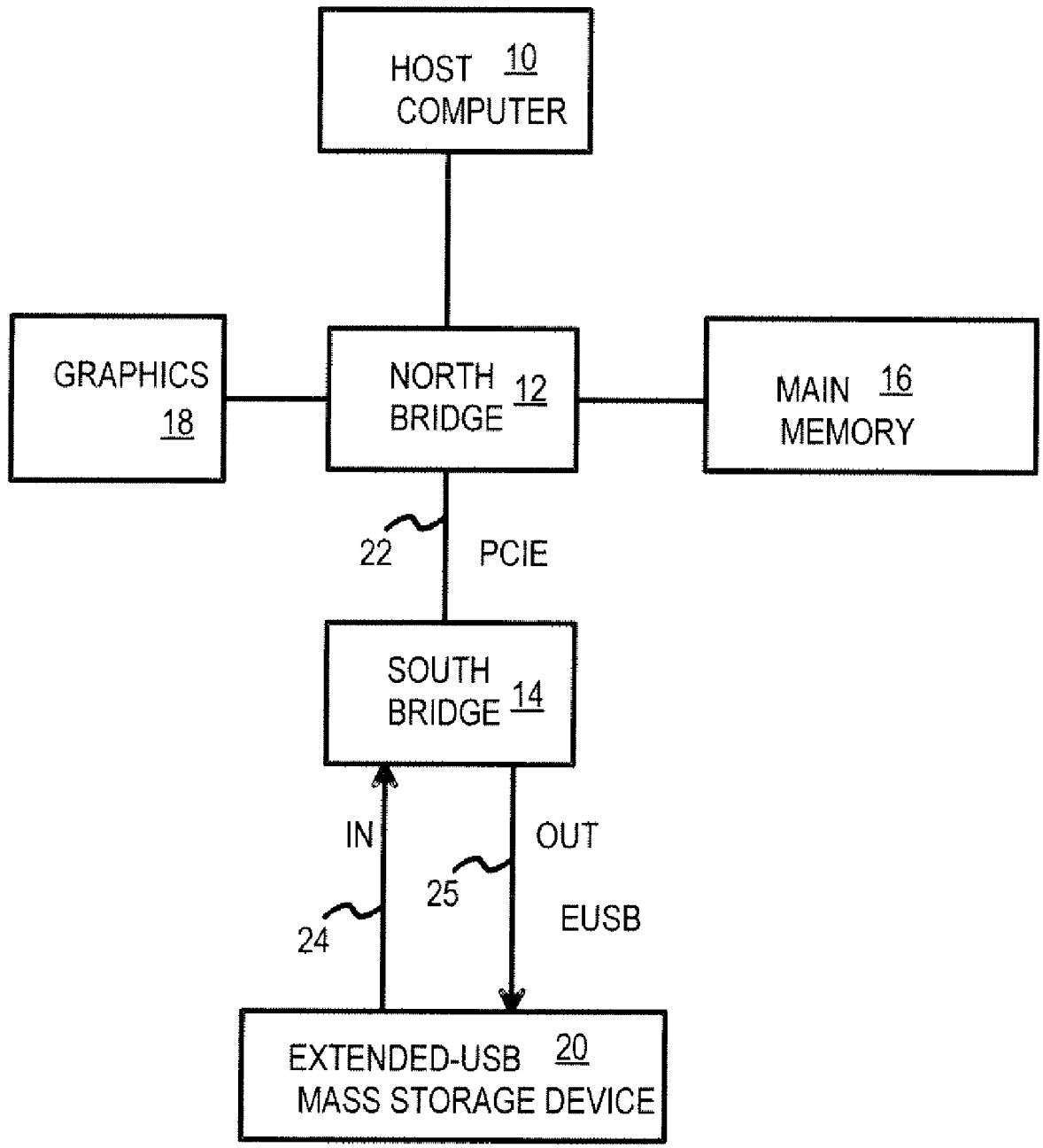
FIG. 1A is a block diagram of a simplified host and device connected with an extended USB (EUSB).

FIG. 1A is a block diagram of a simplified host and device connected with an extended USB (EUSB). Referring to FIG. 1A, host computer 10 executes instructions including those in user and application programs, operating systems, device drivers, and other applets. Main memory 16 may be a dynamic random-access memory (DRAM) or other kind of RAM that stores instructions and data that is accessed by the central processing unit (CPU) in host computer 10.

North bridge 12 (also referred to as a memory controller) contains bus and memory controllers that generate control signals of the proper timing to main memory 16 and to graphics system 18. North bridge 12 also contains a Peripheral Components Interconnect Express (PCIE) controller that generates transactions on PCIE bus 22.

PCIE bus 22 connects north bridge 12 to south bridge 14. South bridge 14 also contains bus controllers and bus logic. An extended USB (EUSB) controller in south bridge 14 (also referred to as an IO controller) converts PCIE transactions into EUSB transactions that are sent to EUSB device 20 over the EUSB bus. However, rather than time-duplex a single differential pair of lines, two differential pairs are provided, allowing full-duplex data transfers. OUT differential pair 25 can be sending data from the host to EUSB device 20 at the same time that IN differential pair 24 is sending data read from EUSB device 20 back to host computer 10. Thus EUSB device 20 provides a higher performance than an ordinary USB 2.0 device that is only half-duplex.

Figure 1B:
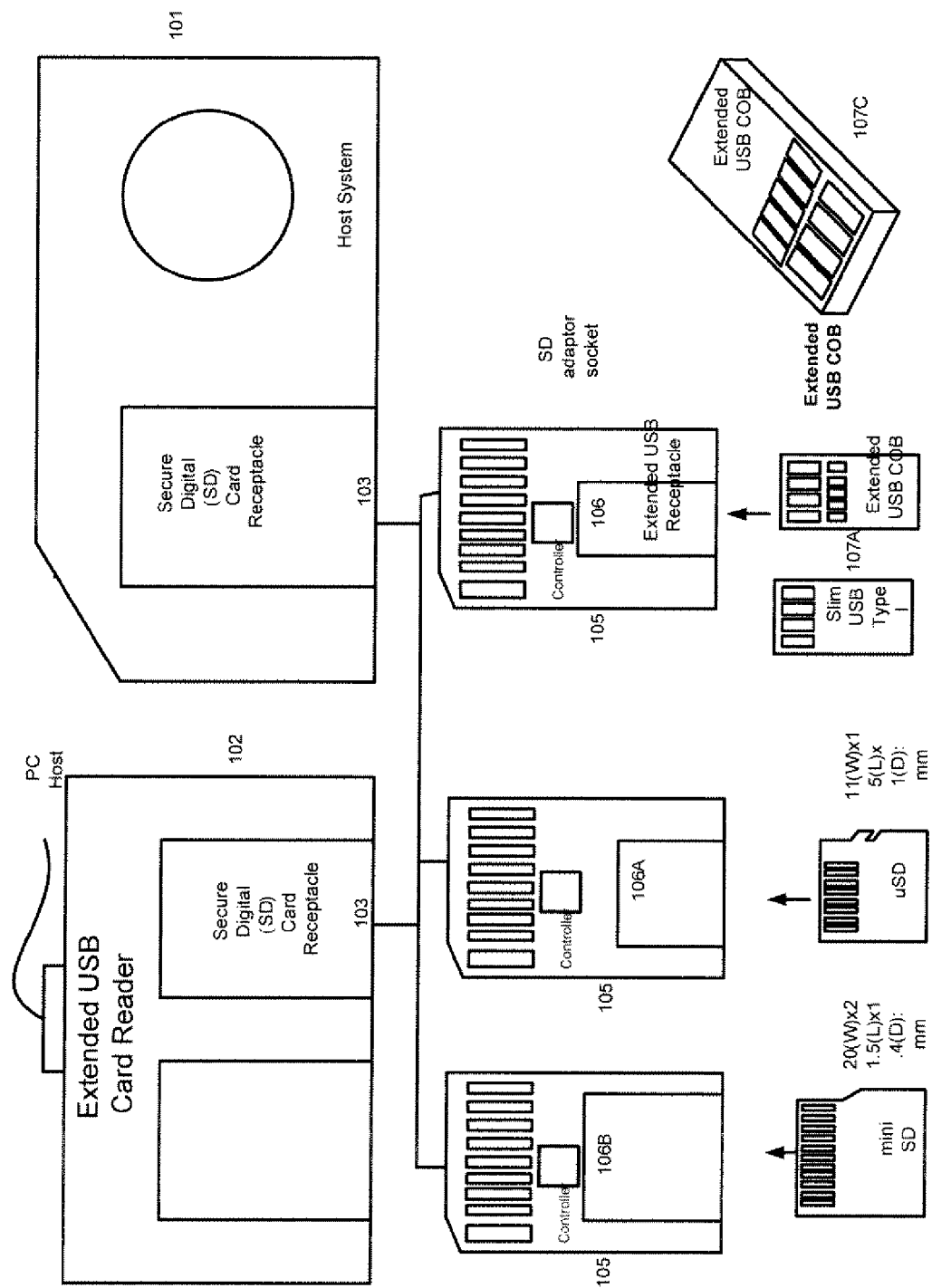
FIGS. 1B-1E are block diagrams illustrating various configurations of EUSB systems according to certain embodiments of the invention.

FIGS. 1B-1E are block diagrams illustrating certain configurations which may be used with the system configuration as shown in FIG. 1A as part of an EUSB system. As shown in FIG. 1B, in addition to other form factors including mini-SD or micro-SD cards that can be inserted into a regular SD socket 103 via an adapter 105 having a specific sockets 106A-106B to receive the specific cards, an EUSB device may also be implemented in a card reader having an EUSB socket or adapter, where the EUSB device can be inserted into an EUSB receptacle 106. An EUSB device may be in a form factor of a slim USB type I 107A, an EUSB chip-on-board (COB) package 107C.

Figure 1C:
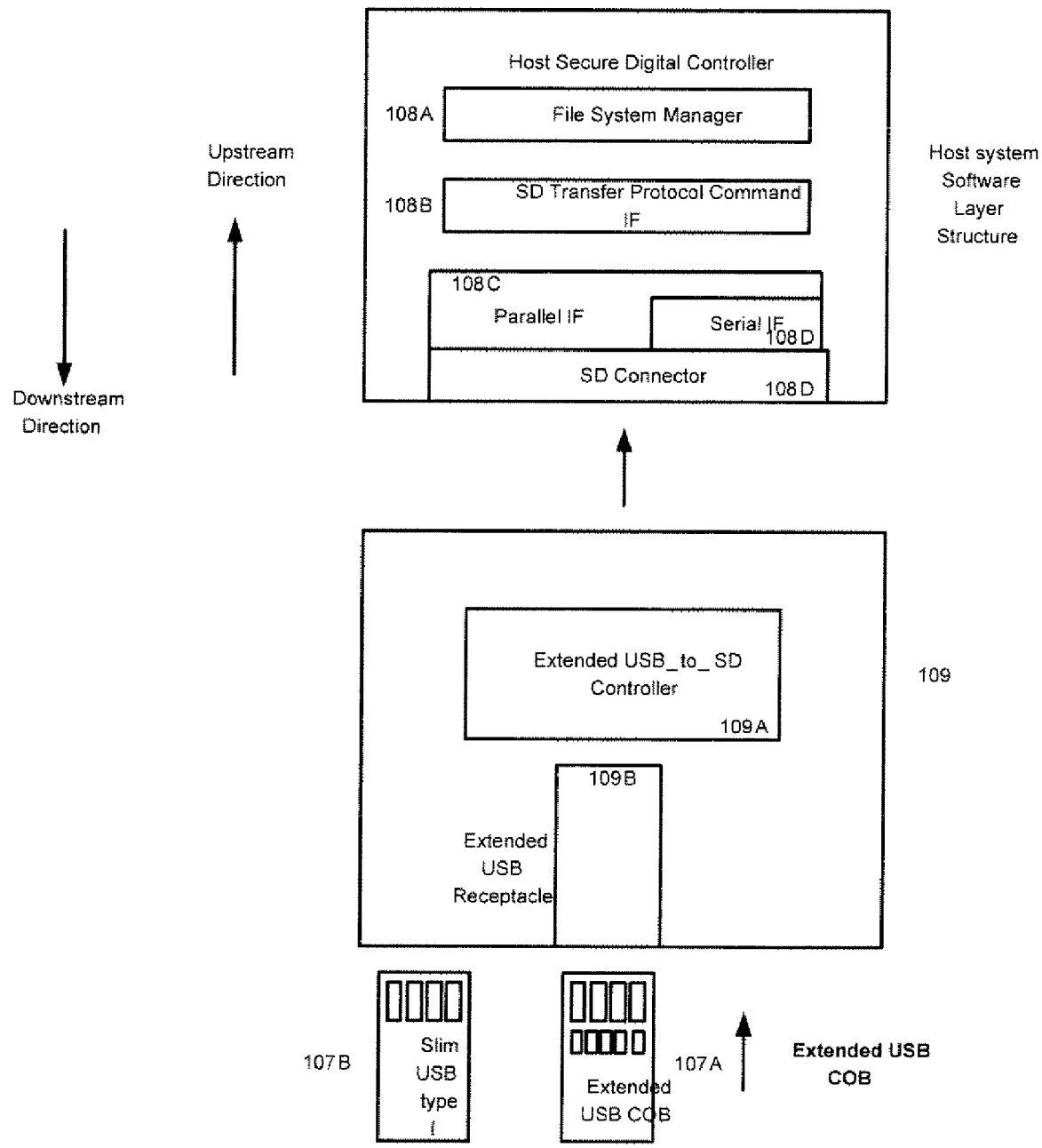

FIG. 1C shows architecture of a host having EUSB capability including a file system manager 108A for process file system calls to access content stored in an EUSB device, which may be in a form factor of slim USB or an EUSB COB inserted into a regular SD slot using EUSB communication protocols. The host further includes an SD transfer protocol command interface 108B for processing SD protocols in view of EUSB protocols. The host further includes a parallel interface 108C and a serial interface 108D, as well as a SD slot that is capable of receive any device having a SD form factor. In addition, a SD adapter or card reader 109 having an EUSB slot 109B that can receive both slim USB device 107B and EUSB device 107A. The SD adapter 109 further includes an EUSB to SD controller to handle communications between SD signals and EUSB signals or protocols.

Figure 1D:
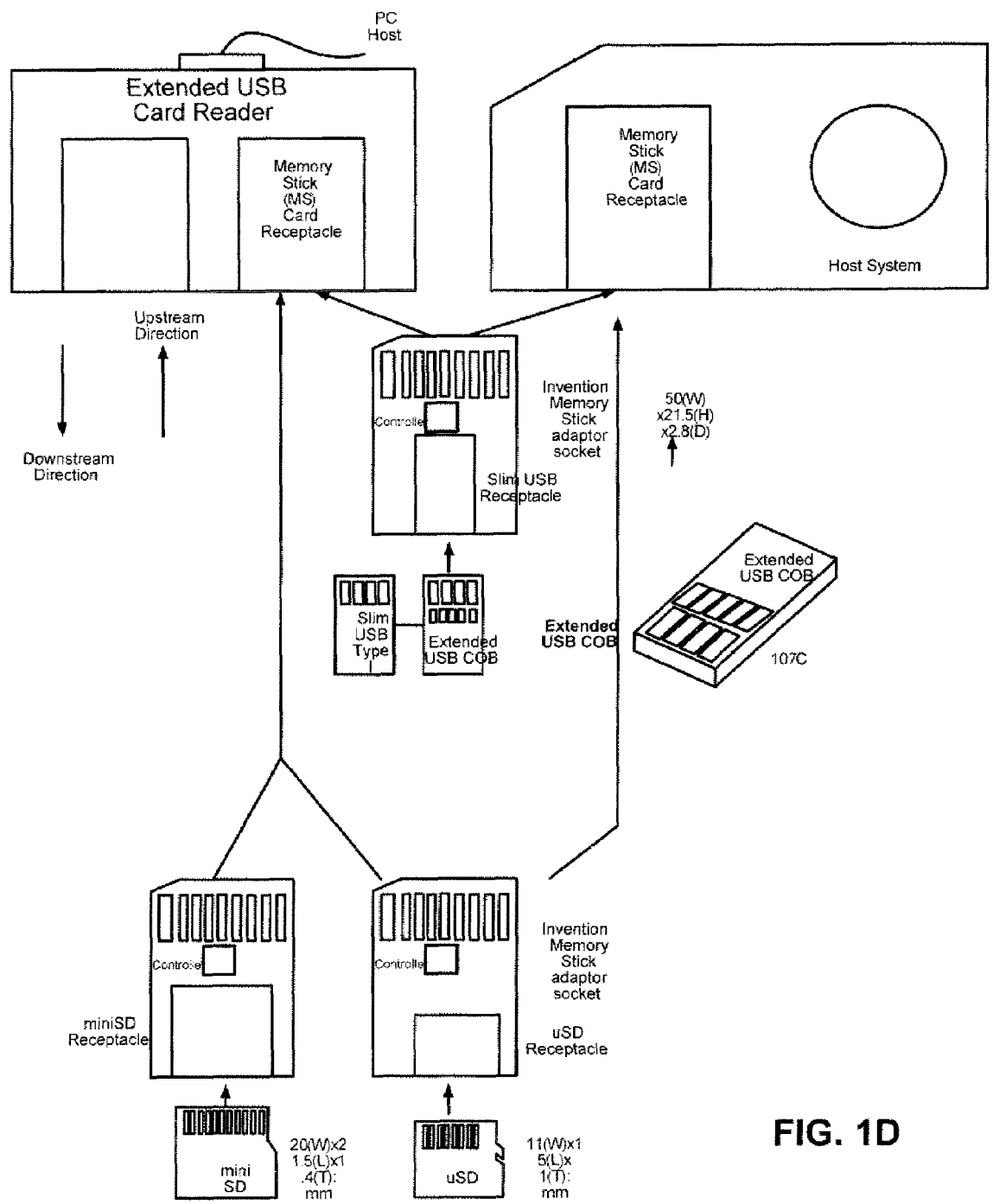
Figure 1E:
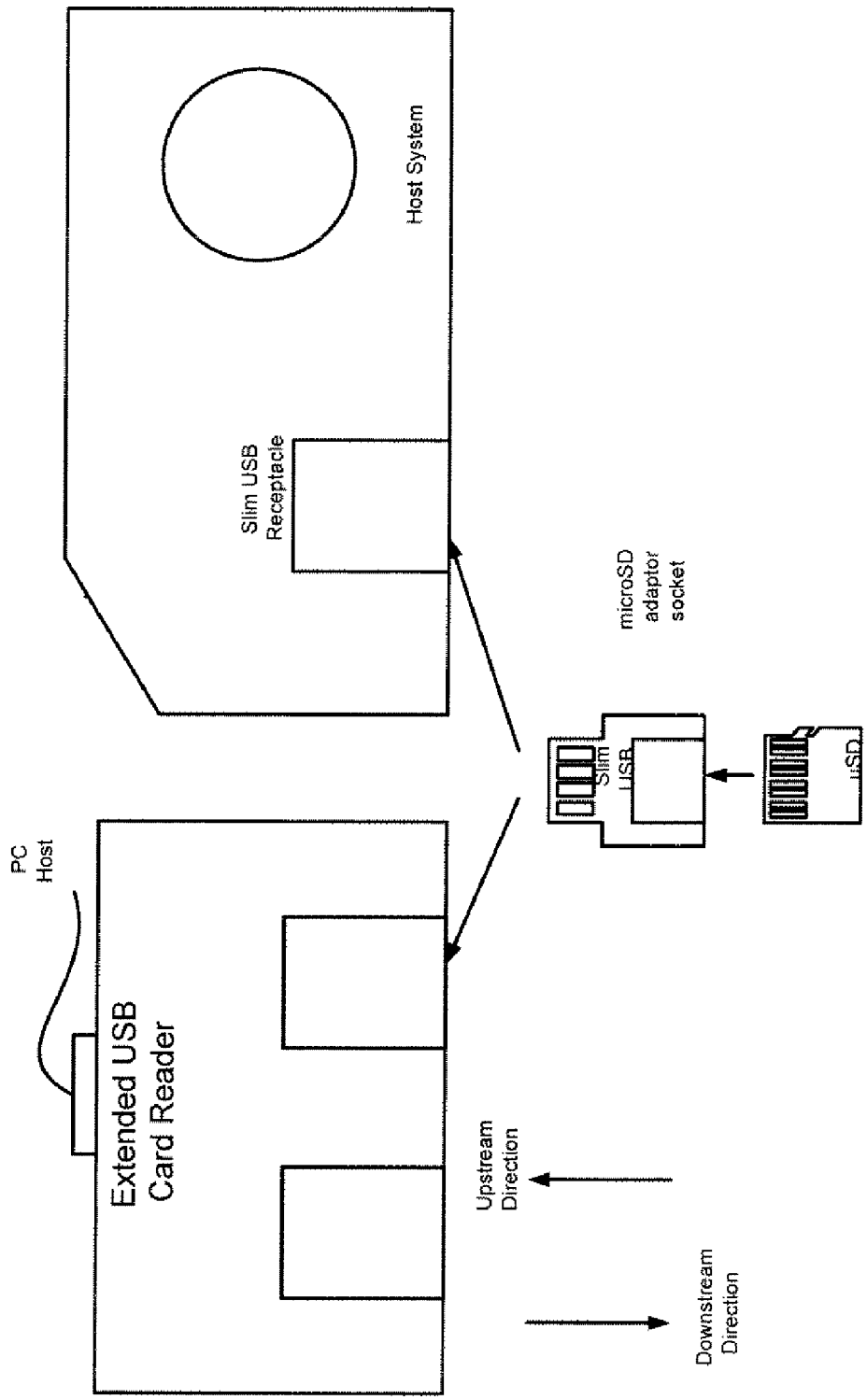

FIG. 1D shows an alternative embodiment with respect to FIG. 1B. FIG. 1E shows an alternative embodiment in which a micro-SD device may also be utilized.

Figure 2:
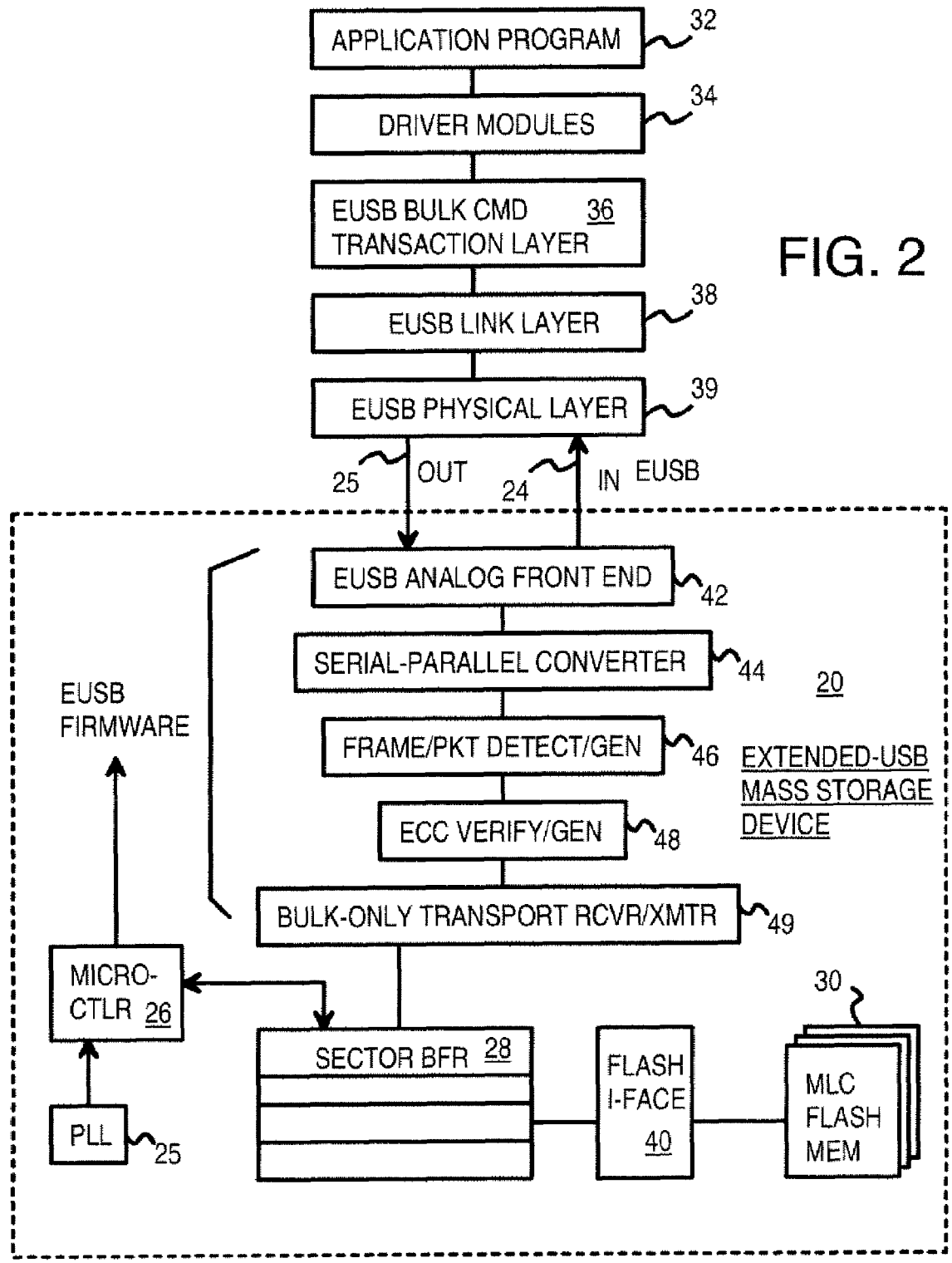
FIG. 2 shows an extended USB device connected to an EUSB host.

FIG. 2 shows an extended USB device connected to an EUSB host. Referring to FIG. 2, application program 32 on a host needs to read data that is stored in flash memory 30 on EUSB device 20. Application program 32 sends a data-read request to a device driver for the flash in device modules 34, which activate EUSB bulk-only-transfer and command transaction layer 36. EUSB bulk-only-transport and command transaction layer 36 embed a read command inside a EUSB data payload and header using the bulk-only-transport mode of USB. A cyclical-redundancy-check (CRC) checksum is also attached.

EUSB link layer 38 adds a sequence number and another CRC checksum, while EUSB physical layer 39 adds packet framing and performs 8/10-bit encoding. The framed data packet is sent from the host to EUSB device 20 over OUT differential pair 25.

EUSB analog front end 42 senses the data transitions on OUT differential pair 25, extracts the clock, and sends serial data to serial-parallel converter 44, which generates parallel data words. The parallel data words are examined by frame and packet detector 46 to locate frame and packet boundaries. The header and data payload can be located by bulk-only-transport receiver 49, ECC generator/checker 48 checks CRC's for error detection. The data payloads can be written into sector buffer 28.

Microcontroller 26 examines the headers and data payloads from bulk-only-transport receiver 49 and detects the read command. Microcontroller 26 activates flash interface 40 to perform a read of flash memory 30, and the flash data read is transferred into sector buffer 28. This flash data in sector buffer 28 is formed into data payloads, a header attached by bulk-only-transport receiver 49, and passed back down the layers for transmission to the host over IN differential pair 24.

Phase-locked loop (PLL) 25 may be driven by an external crystal (not shown) and generates an internal clock to microcontroller 26 and other components such as sector buffer 28. Microcontroller 26 controls operation of EUSB firmware that may include bulk-only-transport receiver 49, ECC generator/ checker 48, frame and packet detector 46, serial-parallel converter 44, and EUSB analog front end 42.

Figure 3:
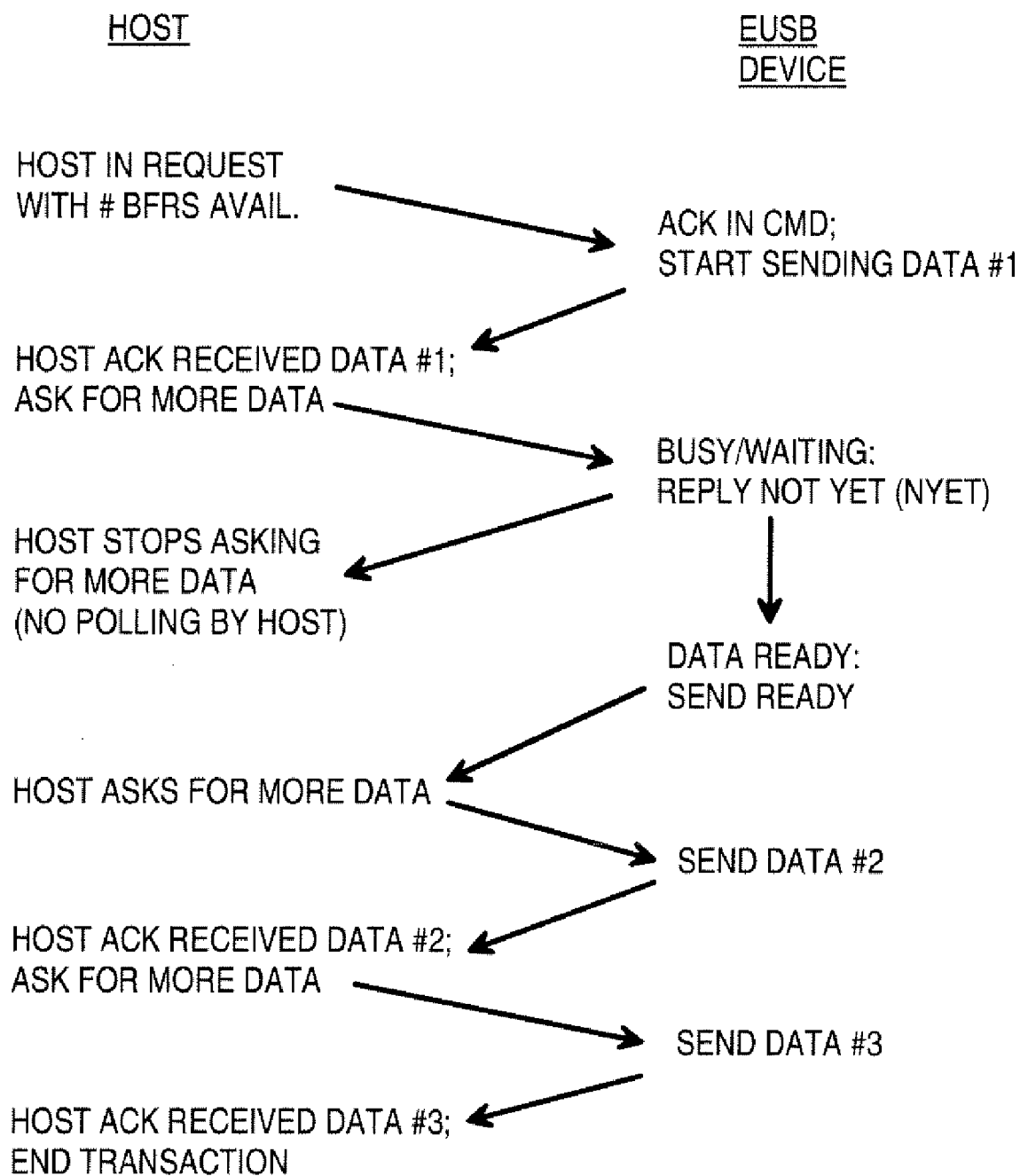
FIG. 3 is a flow diagram highlighting reading of an EUSB device without polling according to one embodiment.

FIG. 3 is a flow diagram highlighting reading of an EUSB device without polling according to one embodiment. When the EUSB device is not yet ready to send data to the host, the EUSB device asserts a not yet (NYET) signal to the host. When the EUSB device is ready again to send data, it asserts a ready (RDY) signal to the host, and de-asserts the NYET signal.

The addition of the NYET and RDY signals allows the host to simply monitor these signals to detect when the EUSB device is ready to continue sending data. With the NYET signal, the host no longer has to continuously poll the USB device to determine when the data is ready for transmission.

The host is still the bus master and initiates a transfer by sending a packet with the IN request to the EUSB device. The request also contains a number that indicates a number of buffers available in the host, or the number of packets that can be accepted by the host. Other information such as a device identifier or address of the EUSB device can be included in the IN request packet.

The EUSB device receives the IN request packet and sends an acknowledgement ACK back to the host to acknowledge the IN command. The EUSB device also starts reading the requested data and sending the first part of that data when available. This is data packet #1.

The host acknowledges receipt of data packet #1 by sending an ACK packet back to the EUSB device. This ACK packet implicitly also request that the next data packet be sent. However, the EUSB device is not yet ready to send the second data packet, data #2. Perhaps the reading of the flash memory is delayed, or data #2 is not cached while data #1 was cached by the flash controller. The busy EUSB device sends a NYET packet back to the host to indicate that the data is not yet ready.

In response to the NYET packet, the host stops asking for more data. The host does not poll the EUSB device. Instead, the host simply waits. The host may even enter a lower-power state such as a suspend or sleep state.

The EUSB device eventually reads the data, and stores the data in its sector buffer or in another memory buffer. A ready RDY signal is generated to the host, while the NYET signal is de-asserted. The NYET, RDY, and ACK signals may be flags in a packet header that are set or cleared. Thus separate signal lines to the host are not required, and the NYET, RDY, and ACK signals may be carried over the differential pair signal lines with the header, data payloads, framing, and other information in the data stream.

The host responds to the RDY signal by asking for more data to be sent. The EUSB then forms the data into a packet as data #2, which is sent to the host. The host acknowledges receipt of data #2, and asks for more data. The EUSB device then sends data #3, which the host acknowledges. When the initial IN request had a number of buffers equal to 3, then all requested data is received by the host, and the IN transaction ends.

Figure 4:
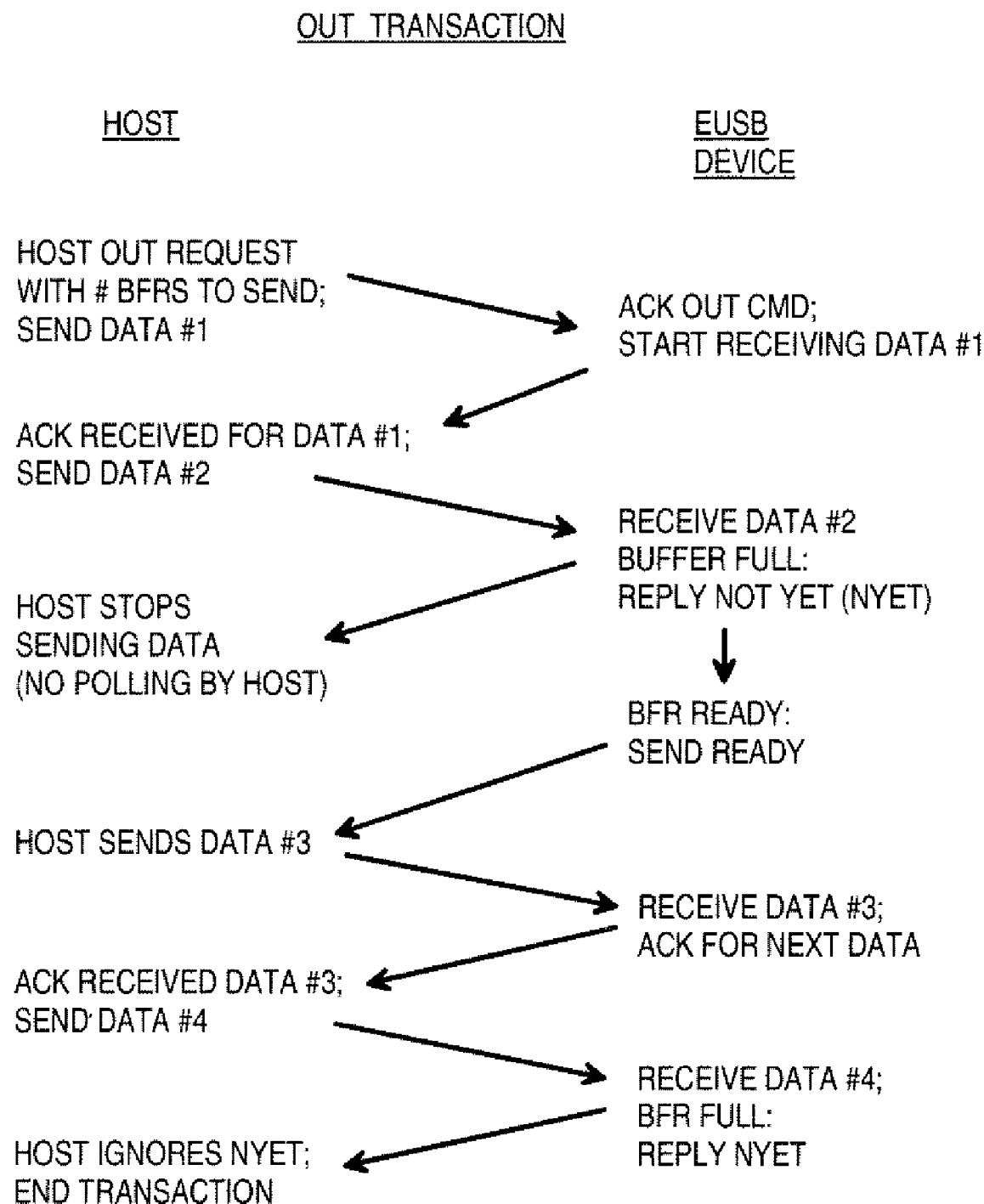
FIG. 4 is a flow diagram highlighting writing to an EUSB device without polling.

FIG. 4 is a flow diagram highlighting writing to an EUSB device without polling. When writing to the EUSB device, data is buffered in a sector buffer, such as sector buffer 28 (FIG. 2). The physical writing to the flash memory may be quite slow. Thus sector buffer 28 may fill up before the data can be written to flash memory and deleted from sector buffer 28. When sector buffer 28 is full, the host must stop sending more data, since there is no place to store this additional data. A buffer overflow may otherwise occur.

When sector buffer 28 is full, the EUSB device is not yet ready to receive more data from the host. The EUSB device asserts a not yet (NYET) signal to the host. When the EUSB device is ready again to receive data, it asserts a ready (RDY) signal to the host, and de-asserts the NYET signal.

The addition of the NYET and RDY signals allows the host to simply monitor these signals to detect when the EUSB device is ready to continue receiving data. With the NYET signal, the host no longer has to continuously poll the USB device to determine when the data may be transmitted.

The host is still the bus master and initiates a transfer by sending a packet with the OUT request to the EUSB device. The request also contains a number that indicates a number of buffers or packets of data from the host. Other information such as a device identifier or address of the EUSB device can be included in the OUT request packet.

The EUSB device receives the OUT request packet and sends an acknowledgement ACK back to the host to acknowledge the OUT command. The EUSB device also starts receiving and buffering the requested data. This is data packet #1.

The EUSB device acknowledges receipt of data packet #1 by sending an ACK packet back to the host. This ACK packet implicitly also request that the next data packet be sent. The host responds by sending data packet #2.

However, the buffer on the EUSB device fills up after receiving data packet #2. The EUSB device is busy writing the buffered data to the flash memory and must wait until this writing is complete and space is made available in the second buffer. The busy EUSB device sends a NYET packet back to the host to indicate that the EUSB device is not yet ready to receive more data.

In response to the NYET packet, the host stops sending more data. The host does not poll the EUSB device. Instead, the host simply waits. The host may even enter a lower-power state such as a suspend or sleep state.

The EUSB device eventually writes the data, and more space is made available in its sector buffer or in another memory buffer. A ready RDY signal is generated to the host, while the NYET signal is de-asserted.

The host responds to the RDY signal by sending more data to the EUSB device. The EUSB receives the data as data #3. The EUSB device acknowledges receipt of data #3, and asks for more data. The host then sends data #4, which the EUSB device acknowledges. However, the EUSB device can only buffer 2 data packets, so the sector buffer is again full. The busy EUSB device again sends a NYET packet back to the host to indicate that the EUSB device is not yet ready to receive more data.

When the initial OUT request had a number of buffers equal to 4, then all requested data has been received by the EUSB device. The host ignores the NYET signal, since all data has been transmitted. The host then ends the OUT transaction.

FIGS. 5A-5B are packet-timing diagrams showing sequences of packets being sent to and received from the EUSB device. In FIG. 5A, the host sends a request to read flash memory from an EUSB device. The read request is embedded inside an IN packet that also contains a number of packets of data to read.

The EUSB device receives the IN packet and begins reading the data. The data may already be buffered in a cache or other buffer, such as when read-ahead caching occurs from an earlier read access. The EUSB device forms the first part of the requested data into data packet #1, which is sent back to the host.

The host sends an acknowledgement ACK to acknowledge receipt of data packet #1, and to request that the next packet be sent. The EUSB device reads the next data, forming data packet #2, which is also sent to the host.

The host sends another acknowledgement ACK to acknowledge receipt of data packet #2, and to request that the next packet be sent. However, the EUSB device cannot keep up with the pace of the host. The EUSB device sends a not yet NYET packet to the host since the next data is not yet ready.

The host responds to NYET signal by waiting. The host does not poll the EUSB device, but simply waits. After some time, the EUSB device catches up, and sends a ready RDY signal to the host. The EUSB device reads the next data, forming data packet #3, which is also sent to the host. The host sends an acknowledgement ACK to acknowledge receipt of data packet #3. Since only 3 packets were requested with the IN packet, the IN transaction ends.

In FIG. 5B, the host sends a request to write to flash memory in an EUSB device. The write request is embedded inside an OUT packet that also contains a number of packets of data to write. The host forms the first part of the write data into data packet #1, which is sent to the EUSB device after the OUT packet is sent.

The EUSB device receives the OUT packet and begins writing the data from data packet #1. The data may first be buffered in a cache or other buffer before writing to flash memory.

The EUSB device sends an acknowledgement ACK to acknowledge receipt of data packet #1, and to request that the next packet be sent. The host forms the next data into data packet #2, which is also sent to the EUSB device.

The EUSB device buffer is now full. The EUSB device cannot keep up with the pace of the host. The EUSB device sends a not yet NYET packet to the host since the sector buffer is full, and the EUSB device cannot receive more data.

The host responds to NYET signal by waiting. The host does not poll the EUSB device, but simply waits. After some time, the EUSB device catches up, and sends a ready RDY signal to the host. Since the EUSB device did not acknowledge receipt of data packet #2, the host re-sends data packet #2. The EUSB device buffers this data, and sends an acknowledgement ACK for the re-sent data packet #2.

The host forms data packet #3, which is also sent to the EUSB device. The EUSB device sends an acknowledgement ACK to acknowledge receipt of data packet #3. Since only 3 packets were requested with the OUT packet, the OUT transaction ends.

Figure 6:
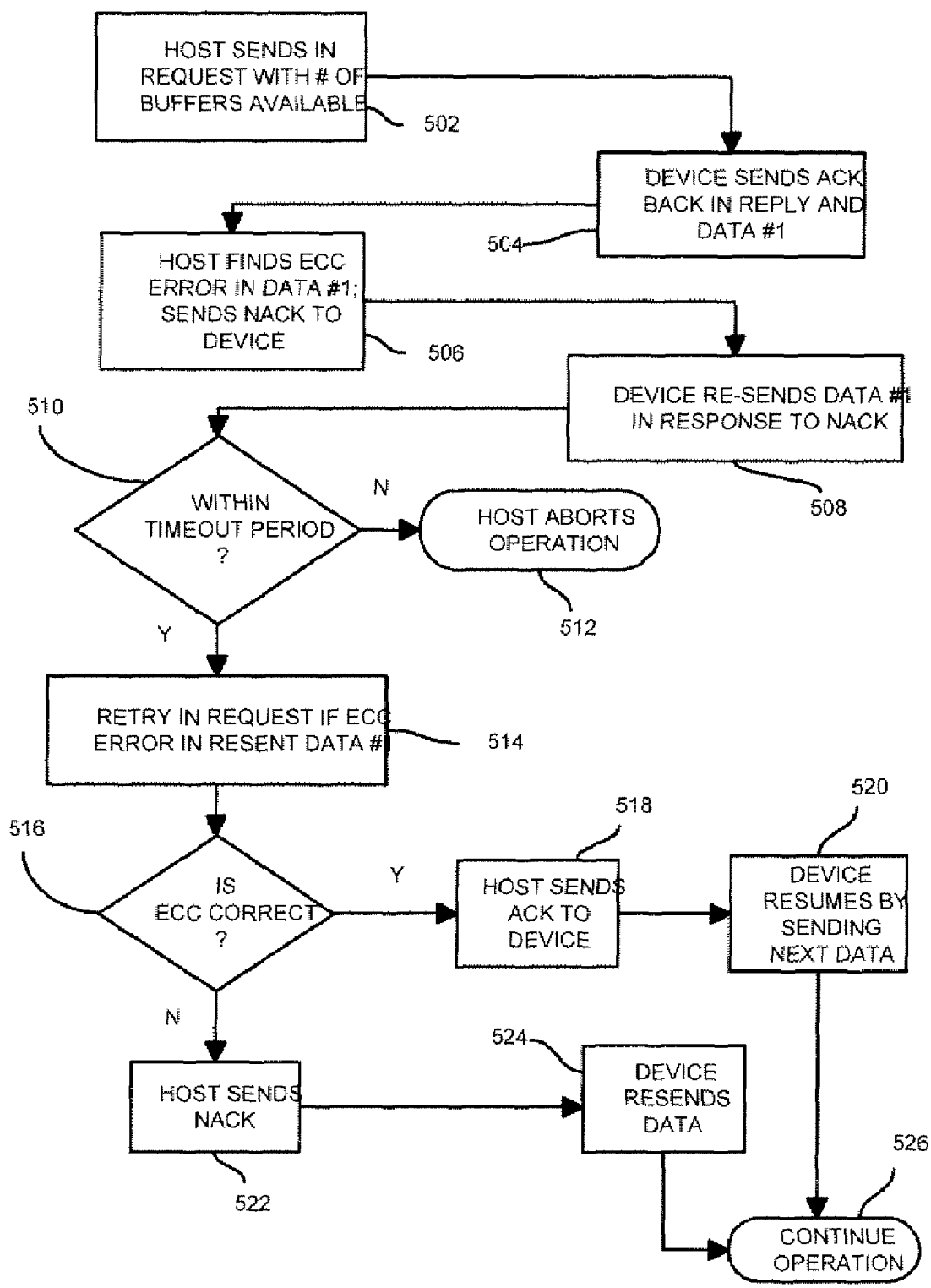
FIG. 6 is a flowchart of a basic IN protocol flow with not-acknowledge (NACK) to avoid polling.

FIG. 6 is a flowchart of a basic IN protocol flow with not-acknowledge (NACK) to avoid polling. The EUSB host sends an IN request with the number of packet-buffers to transfer, step 502. The EUSB device sends back an acknowledgement ACK to the IN request and sends the first packet of data, step 504.

The host checks the transmitted data for errors by generating a CRC of the received data and comparing the generated CRC to a stored or transmitted CRC that was computed on the pre-transmitted data. When the CRC's mismatch, an error is detected. When the host finds an error using ECC, step 506, the host sends back a not-acknowledge (NACK) rather than an acknowledgement ACK.

The EUSB device responds to the NACK by re-sending the previous data, step 508. If the host does not receive the re-sent data within the timeout period, step 510, then the operation is aborted, step 512.

When the response is received within the timeout period, step 510, then the CRC or Error-Correction-Code (ECC) is checked on the re-sent data, step 516. When ECC is used rather than CRC, small errors may be corrected without requiring re-sending of the data. When the ECC indicates that the re-sent data is correct, step 516, then the host sends an acknowledgement ACK to the EUSB device, step 518. The EUSB device resumes by sending the next data packet, step 520, and the operation continues, step 526.

When the ECC indicates that the re-sent data has an error, step 516, then the host sends a not-acknowledgement NACK to the EUSB device, step 522. The EUSB device responds by re-sending the data, step 524, and the operation continues, step 510.

Figure 7:
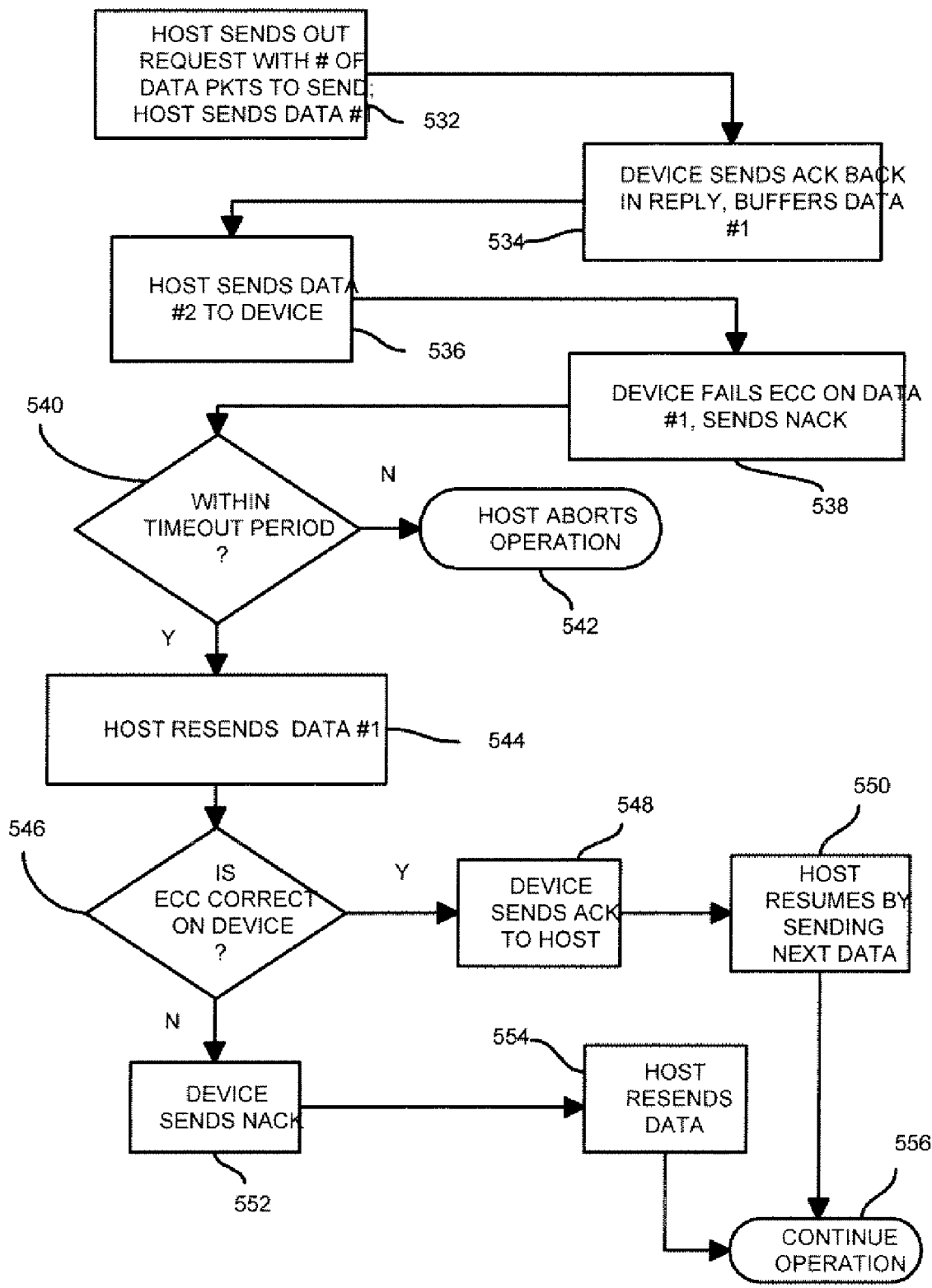
FIG. 7 is a flowchart of a basic OUT protocol flow with not-acknowledge (NACK) to avoid polling.

FIG. 7 is a flowchart of a basic OUT protocol flow with not-acknowledge (NACK) to avoid polling. The EUSB host sends an OUT request with the number of packet-buffers to transfer, step 532. The host also sends the first data for writing into the EUSB device, step 532.

The EUSB device buffers the first data packet and sends back an acknowledgement ACK to the OUT request, step 534. The host receives the ACK and sends the second data packet, data #2, step 536.

The EUSB device checks the transmitted data for errors by generating a CRC of the received data and comparing the generated CRC to a stored or transmitted CRC that was computed on the pre-transmitted data. When the CRC's mismatch, an error is detected. When the EUSB device finds an error using ECC, step 538, the EUSB device sends back a not-acknowledge (NACK) rather than an acknowledgement ACK.

If the host does not receive the response from the EUSB device within the timeout period, step 540, then the operation is aborted, step 542. Otherwise, when the host responds to the NACK by re-sending the previous data, step 544.

When the response is received within the timeout period, step 540, then the CRC or Error-Correction-Code (ECC) is checked by the EUSB device on the re-sent data, step 546. When the ECC indicates that the re-sent data is correct, step 546, then the EUSB device sends an acknowledgement ACK to the host, step 548. The host resumes by sending the next data packet, step 550, and the operation continues, step 556.

When the ECC indicates that the re-sent data has an error, step 546, then the EUSB device sends a not-acknowledgement NACK to the host, step 552. The host responds by re-sending the data, step 554, and the operation continues, step 540.

Figure 8A:
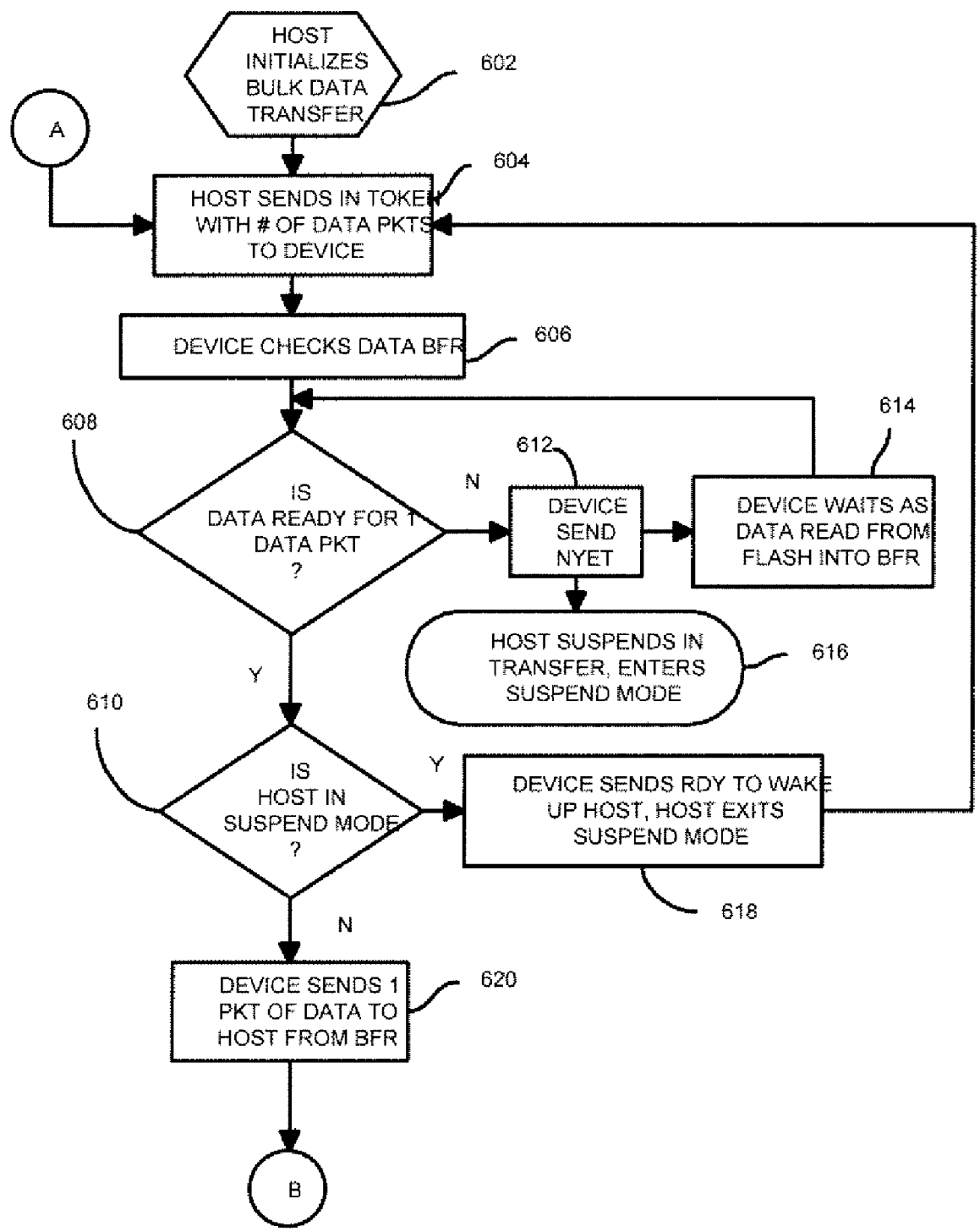
FIGS. 8A-8B show a flowchart of an EUSB host suspending while an EUSB device is busy during an IN transfer.
Figure 8B:
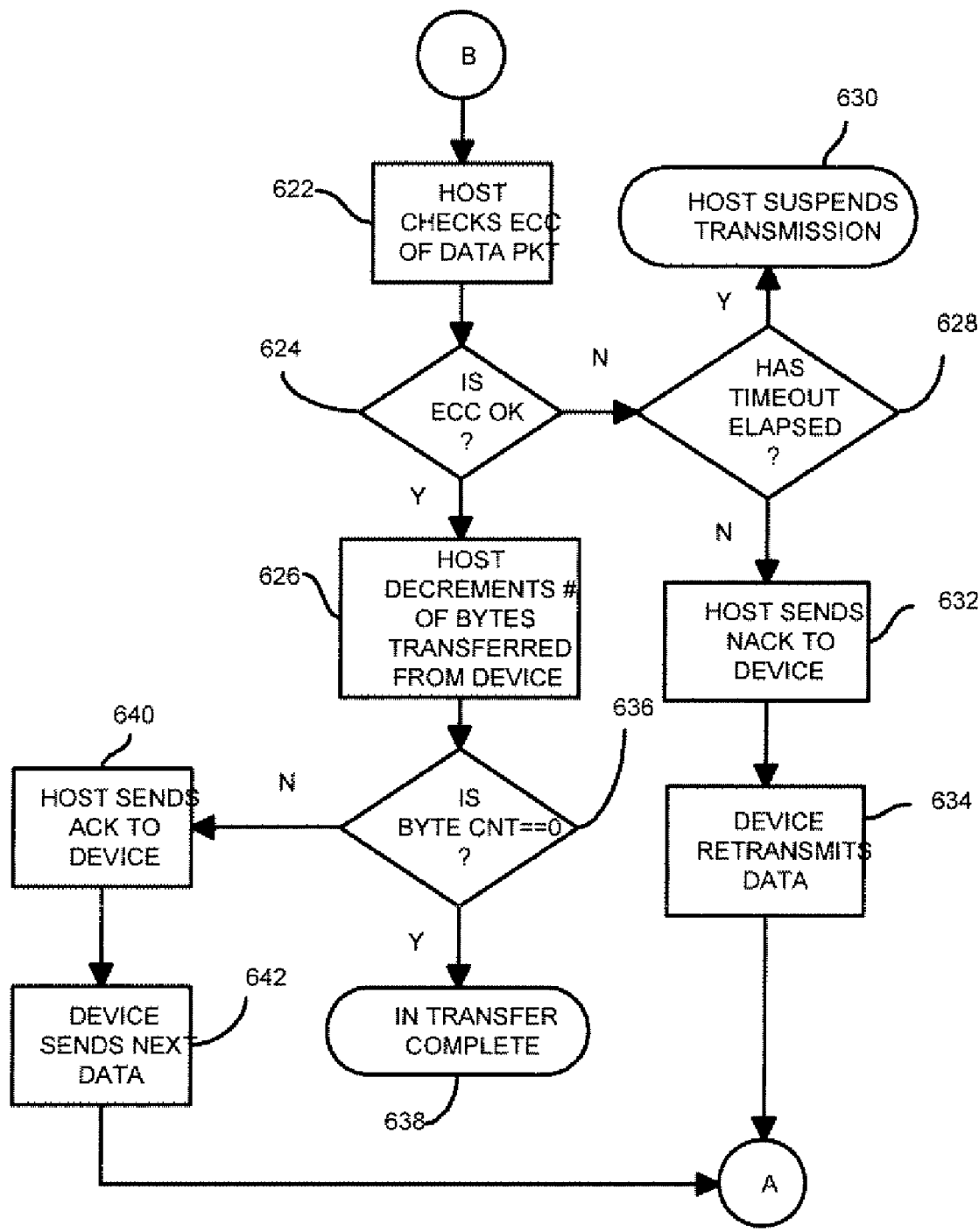

FIGS. 8A-8B show a flowchart of an EUSB host suspending while an EUSB device is busy during an IN transfer. In FIG. 8A, an EUSB host initiates a transfer using the bulk-only-transfer mode, step 602. The host sends an IN token in a packet to the EUSB device, step 604, with the number of data packets as a parameter in the IN packet.

The EUSB device receives the IN packet and checks its sector buffer or other cache, step 606, to determine if the first packet of the requested data has already been read. The first packet could have been read earlier and cached in the sector buffer.

When the EUSB device has at least 1 packet ready, step 608, and the host is not in the sleep mode, step 610, then the EUSB device sends one packet of data from its sector buffer to the host, step 620. The flow then continues with FIG. 8B.

For many read operations, the data is not cached by the EUSB device. Step 608 fails because the requested data has not yet been read from the flash memory and loaded into the sector buffer. The EUSB device sends a not yet NYET signal to the host, step 612, and the host suspends the current IN transfer and enters a sleep mode to save power, step 616.

While the host is in the sleep mode, step 616, the EUSB device reads the requested data from its flash memory. The flash data is written into the sector buffer, step 614. When a full packet of flash data has been read from flash into the sector buffer, step 608, and the host is not in the sleep mode, step 610, then the EUSB device sends one packet of data from its sector buffer to the host, step 620. The flow then continues with FIG. 8B.

However, when the host is still in the sleep mode, step 610, then the EUSB device sends a ready RDY signal to the host, step 618. The ready signal causes the host to wake up from its sleep mode. Since the host has already suspended the current IN transfer, step 616, the host can re-start the current IN transfer from step 604 with another IN packet. However, this time the requested data should be in the sector buffer, and steps 608, 610 will pass, allowing the buffered data to be immediately transferred from the sector buffer to the host, step 620.

In FIG. 8B, after the first packet has been sent to the host in step 620, the host checks the data packet for errors, such as by generating a CRC, step 622. ECC code may also be used with error correction of small errors such as 1-bit errors. When the CRC or ECC is good, step 624, then the host decrements the bytes transfer count by the number of bytes received, step 626. When the byte count reaches zero, step 636, the transfer is completed, step 638. Otherwise, the host sends an acknowledgement ACK to the EUSB device, step 640, and the EUSB device sends the next data packet, using the flow from step 606 of FIG. 8A.

When the CRC or ECC is bad, step 624, and the timeout has elapsed, step 628, then the host suspends the current IN transfer, step 630. When timeout has not yet elapsed, step 628, the host sends a not-acknowledge NACK to the EUSB device, step 632, since the received data had an error. The EUSB device re-sends the current data packet, step 634, and the flow continues from step 606 of FIG. 8A.

Figure 9A:
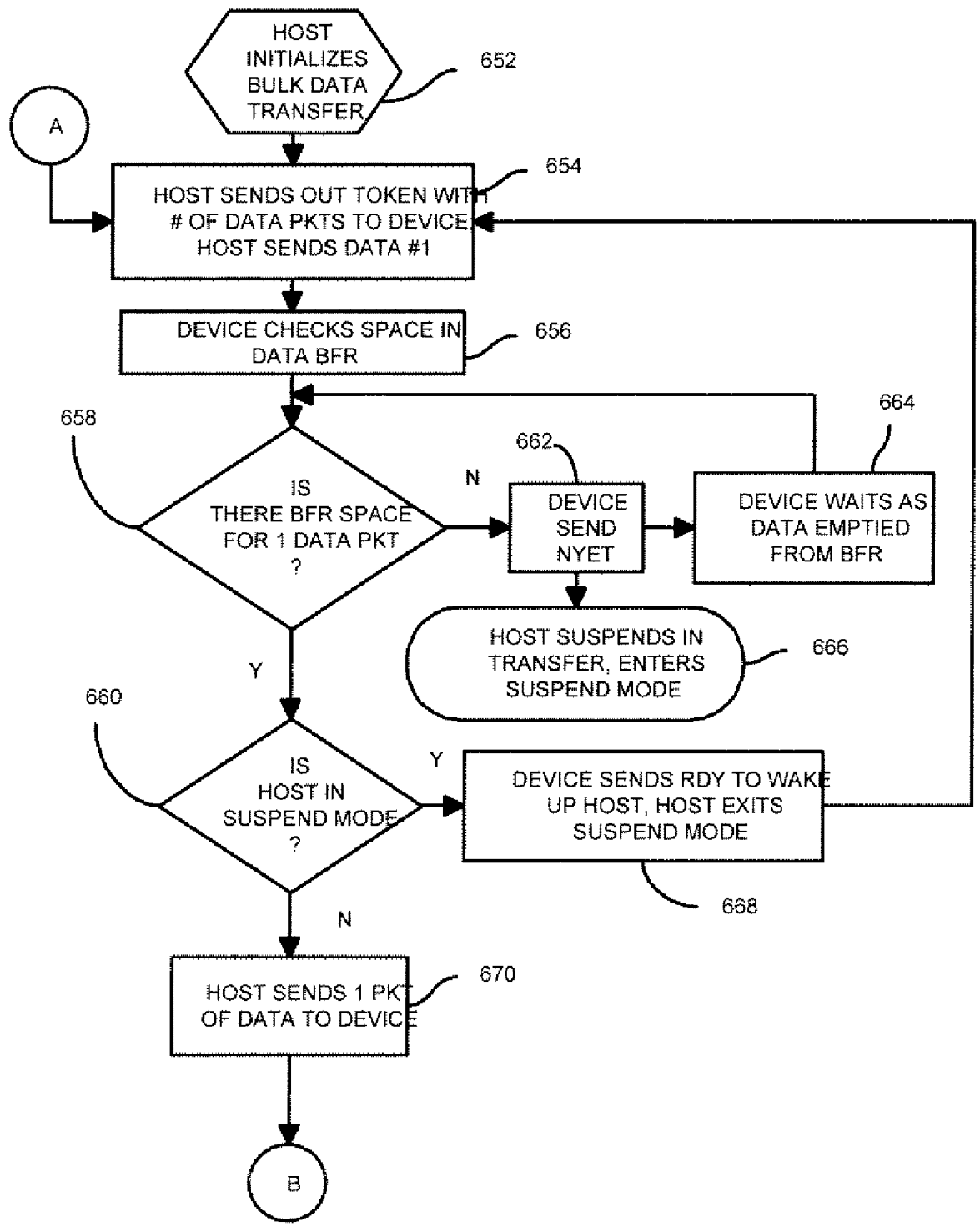
FIGS. 9A-9B show a flowchart of an EUSB host suspending while an EUSB device is busy during an OUT transfer.
Figure 9B:
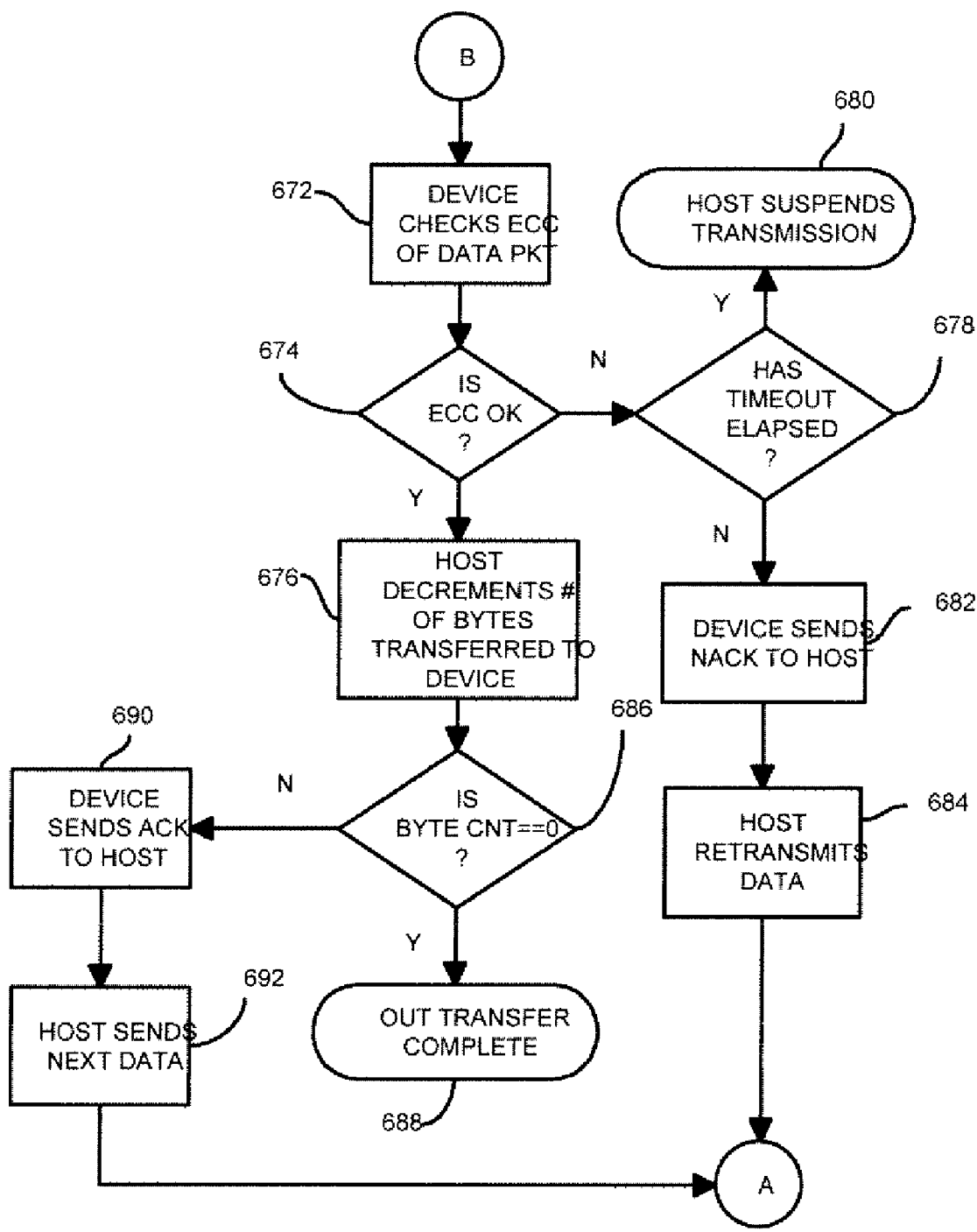

FIGS. 9A-9B show a flowchart of an EUSB host suspending while an EUSB device is busy during an OUT transfer. In FIG. 9A, an EUSB host initiates a transfer using the bulk-only-transfer mode, step 652. The host sends an OUT token in a packet to the EUSB device, step 654, with the number of data packets as a parameter in the OUT packet.

The EUSB device receives the OUT packet and checks for empty space in its sector buffer or other cache, step 656, to determine if there is enough room to store the first packet.

When the EUSB device can accept at least 1 packet, step 658, and the host is not in the sleep mode, step 660, then the EUSB device receives one packet of data sent by the host, step 670. The packet is written into the sector buffer of the EUSB device. The flow then continues with FIG. 9B.

Write operations to flash tend to be relatively slow, so the sector buffer may already be full. Step 658 fails because the sector buffer is full of old data that has not yet been written into the flash memory and removed from the sector buffer. The EUSB device sends a not yet NYET signal to the host, step 662, and the host suspends the current OUT transfer and enters a sleep mode to save power, step 666.

While the host is in the sleep mode, step 666, the EUSB device writes data from its sector buffer into its flash memory. Eventually, enough data is written to flash that the sector buffer can store more data, step 664. When enough space is made for a full packet of flash data in the sector buffer, step 658, and the host is not in the sleep mode, step 660, then the EUSB device accepts one packet of data, which is written into its sector buffer, step 670. The flow then continues with FIG. 9B.

However, when the host is still in the sleep mode, step 660, then the EUSB device sends a ready RDY signal to the host, step 668. The ready signal causes the host to wake up from its sleep mode. Since the host has already suspended the current OUT transfer, step 666, the host can re-start the current OUT transfer from step 654 with another OUT packet. However, this time the sector buffer should have enough space to accept the data packet, and steps 658, 660 will pass, allowing the data from the host to be immediately written into the sector buffer, step 670.

In FIG. 9B, after the first packet has been received from the host in step 670, the EUSB device checks the data packet for errors, such as by generating a CRC, step 672. ECC code may also be used with error correction of small errors such as 1-bit errors. When the CRC or ECC is good, step 674, then the EUSB device sends an acknowledgement ACK to the host, step 690. The host decrements the bytes transfer count by the number of bytes received, step 676. When the byte count reaches zero, step 686, the transfer is completed, step 688. Otherwise, the host sends, and the EUSB device sends the next data packet, using the flow from step 656 of FIG. 9A.

When the CRC or ECC is bad, step 674, and the timeout has elapsed, step 678, then the host suspends the current OUT transfer, step 680. When timeout has not yet elapsed, step 678, the EUSB device sends a not-acknowledge NACK to the host, step 682, since the received data had an error. The host re-sends the current data packet, step 684, and the flow continues from step 656 of FIG. 9A.

Figure 10A:
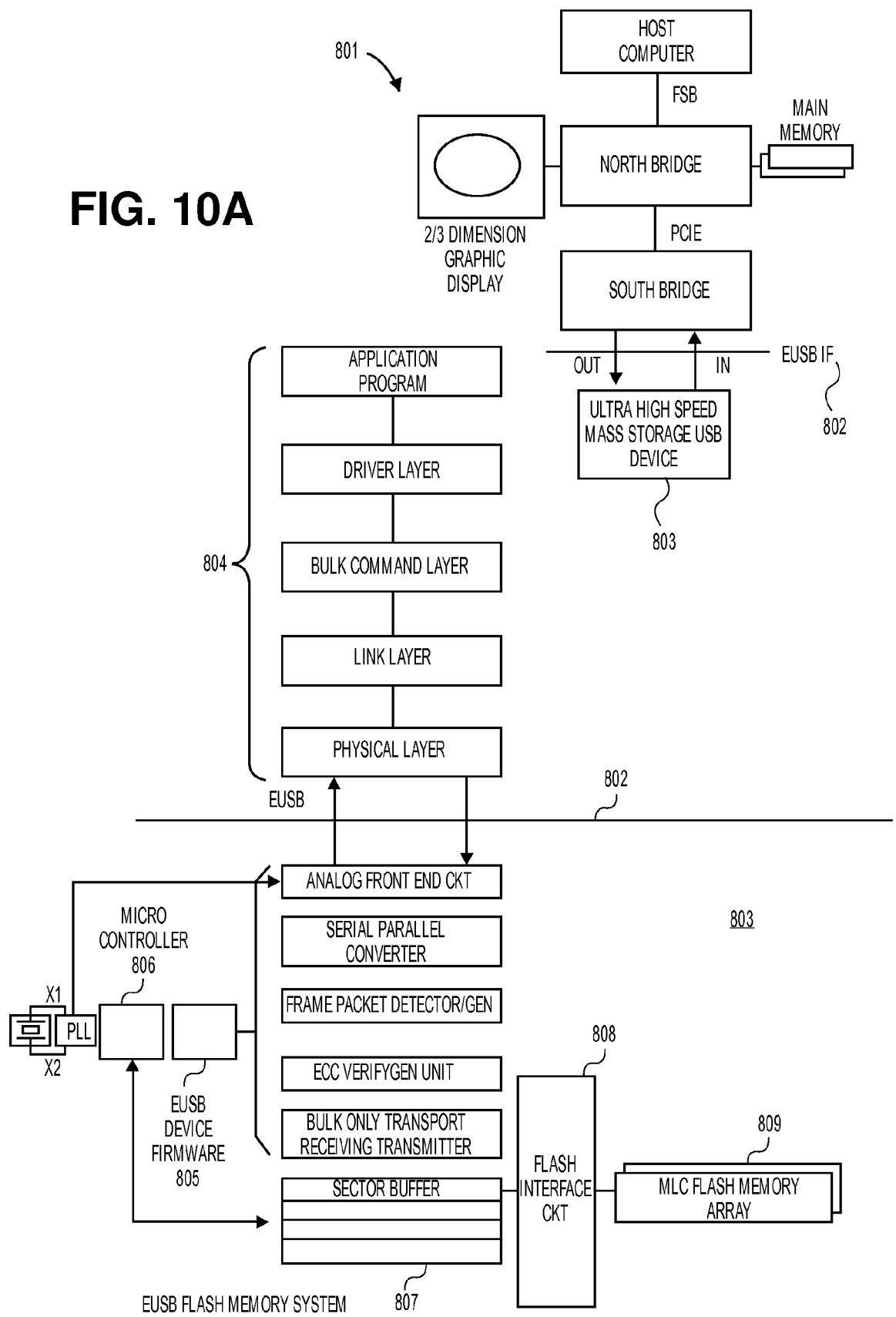
FIGS. 10A-10D are block diagrams illustrating examples of EUSB system architectures according to certain embodiments of the invention.

FIG. 10A is a block diagram illustrating an exemplary extended USB (EUSB) system according to one embodiment of the invention. As hardware configuration, an EUSB device 803 is coupled to a host system 801 via an EUSB interface 802. Host 801 can be any of computer having an EUSB interface 802, including one or more processors coupled to, for example, via a front-side bus (FSB) a memory controller (also referred to as a north bridge) of which a main memory and a display device is attached. The memory controller is coupled to, for example, a PCI express bus to an IO controller (also referred to as a south bridge), from which an EUSB device 803 is attached.

Within the host computer, a software network stack 804 is used by the host 801 to communicate with the EUSB device 803. Similar to a network stack such as an OSI (Open Systems Interconnection) network stack, network stack 804 includes an application layer, a driver layer, a bulk command layer, a data link layer, and a physical layer. In one embodiment, the bulk command layer is configured to package one or more commands in a bulk embedded within a packet such that a single packet may carry one or more commands to one or more recipients as a bulk. As a result, the speed of the communications may be greatly enhanced.

EUSB device 803 includes an EUSB firmware 805 having an analog front end, a serial/parallel converter, a frame/packet detector/generator, an ECC (error correction code) verity/generator unit, a bulk only transport (BOT) receiving/transmitter. The EUSB device 803 further includes a micro controller 806 controlling a buffer 807 for buffering the packets which may be stored or read to/from MLC (multi-level cell) flash memory array 809 via interface circuit 808.

Figure 10B:
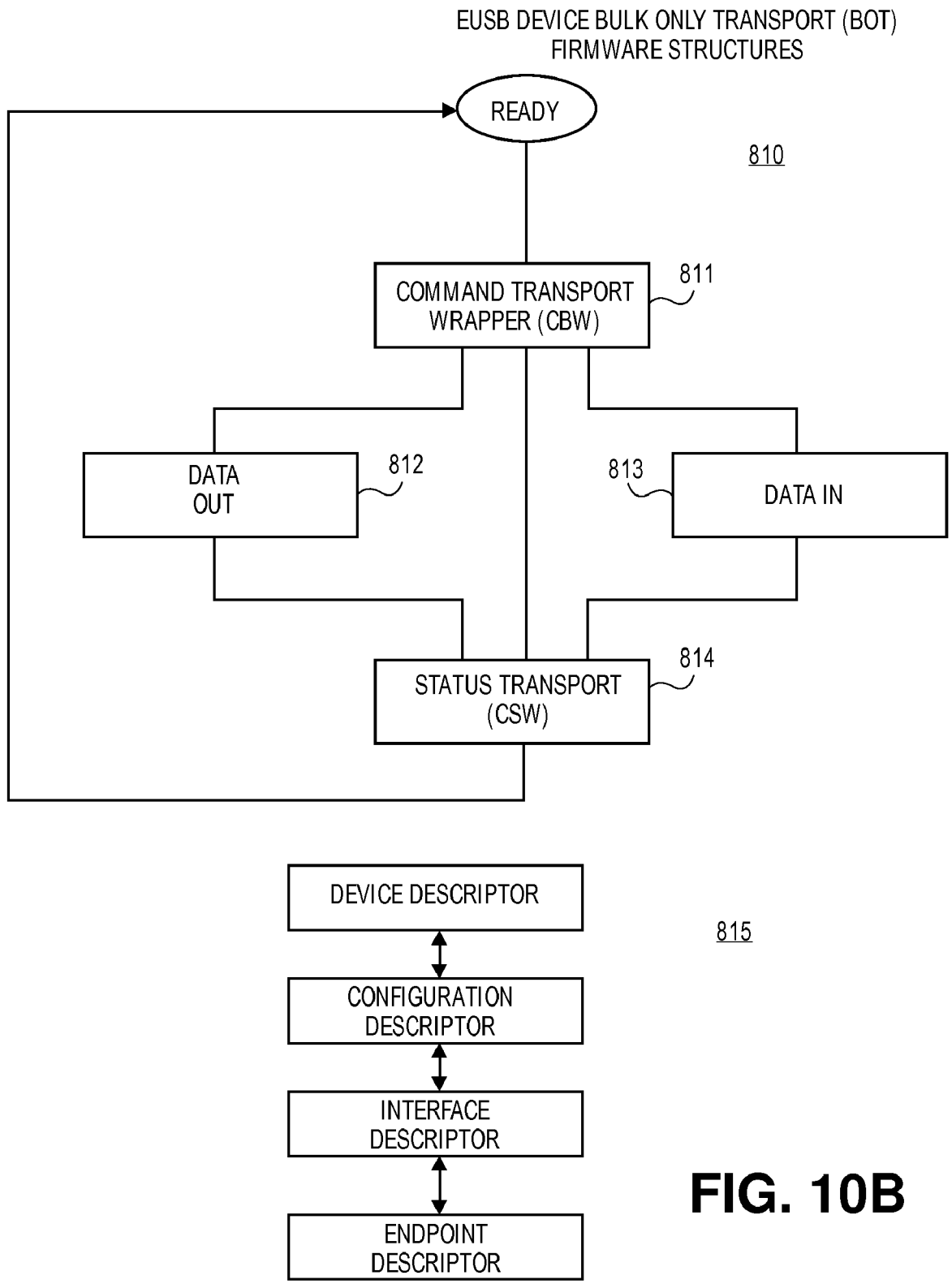

FIG. 10B is a block diagram illustrating an example of bulk-only transport (BOT) firmware structure according to one embodiment. Referring to FIG. 10B, BOT firmware structure 810 includes a command transport wrapper 811, data out unit 812, data in unit 813, and a status transport 814. A data structure used by the EUSB BOT firmware structure 810 includes a device descriptor, a configuration descriptor, an interface descriptor, and an endpoint descriptor.

Figure 10C:
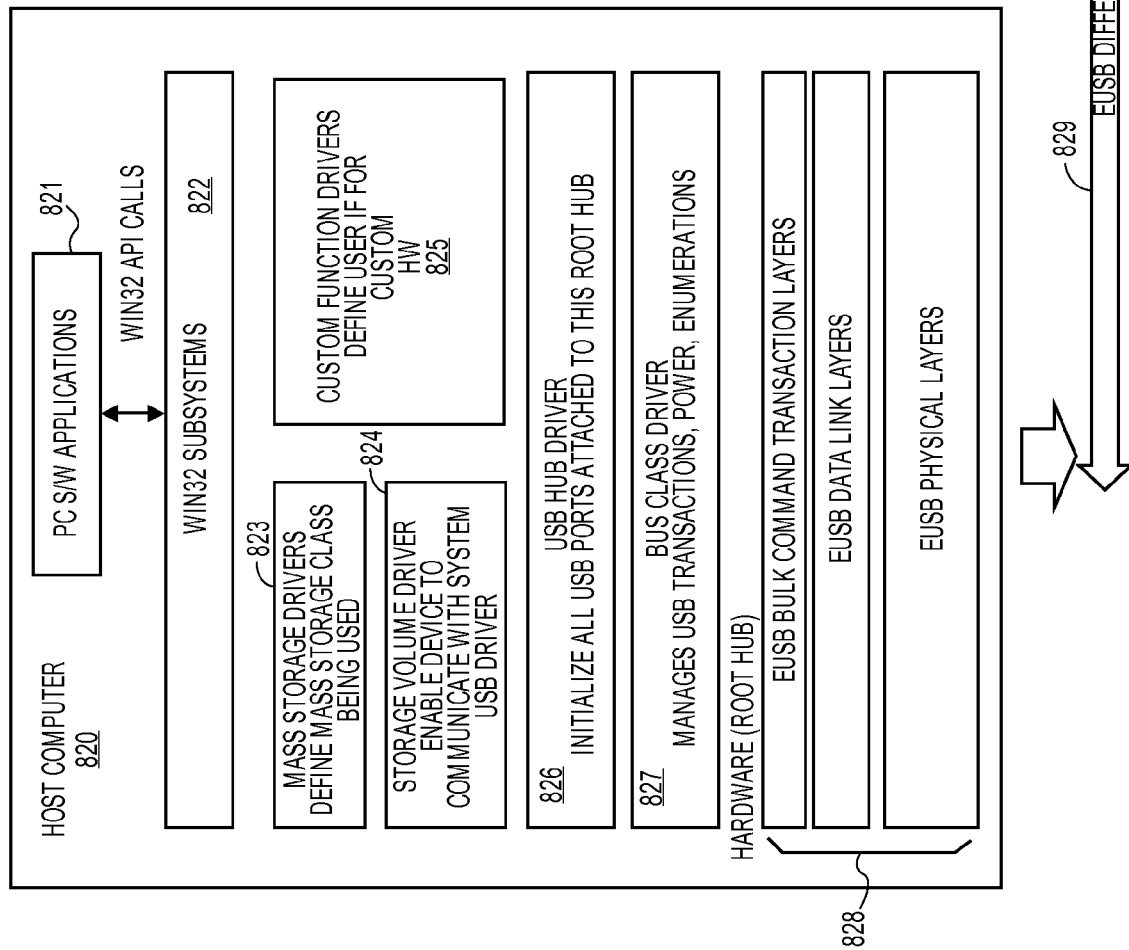

FIG. 10C is a block diagram illustrating a system configuration in which an EUSB device is coupled to a host system according to one embodiment. Referring to FIG. 10C, host computer 820 is communicatively coupled to an EUSB device 830 via an EUSB differential link 829 which has been described in one of the above incorporated by reference copending application assigned to a common assignee of the present application. The host 820, in this example, with a Windows operating system available from Microsoft Corporation, includes one or more applications 821 communicating with a Win32 subsystem 822. The host 820 further includes mass storage drivers 823 that define mass storage classes being used and storage volume drivers 824 that enable devices to communicate with a system USB driver. The host 820 further includes customized function drivers that define user interfaces for customized hardware. In addition, the host 820 further includes a USB hub driver 826 for initializing all USB ports transactions, power, and/or enumerations. The host 820 further includes a bus class driver 827 for managing the same. The host 820 further includes an EUSB stack 828, including a bulk command transport layer, data link layer, and a physical layer. Similarly, USB device 830 includes a flash memory 831, a flash file system interface 832, a bulk command transport layer 833, a data link layer 834, and a physical layer 835.

Figure 10D:
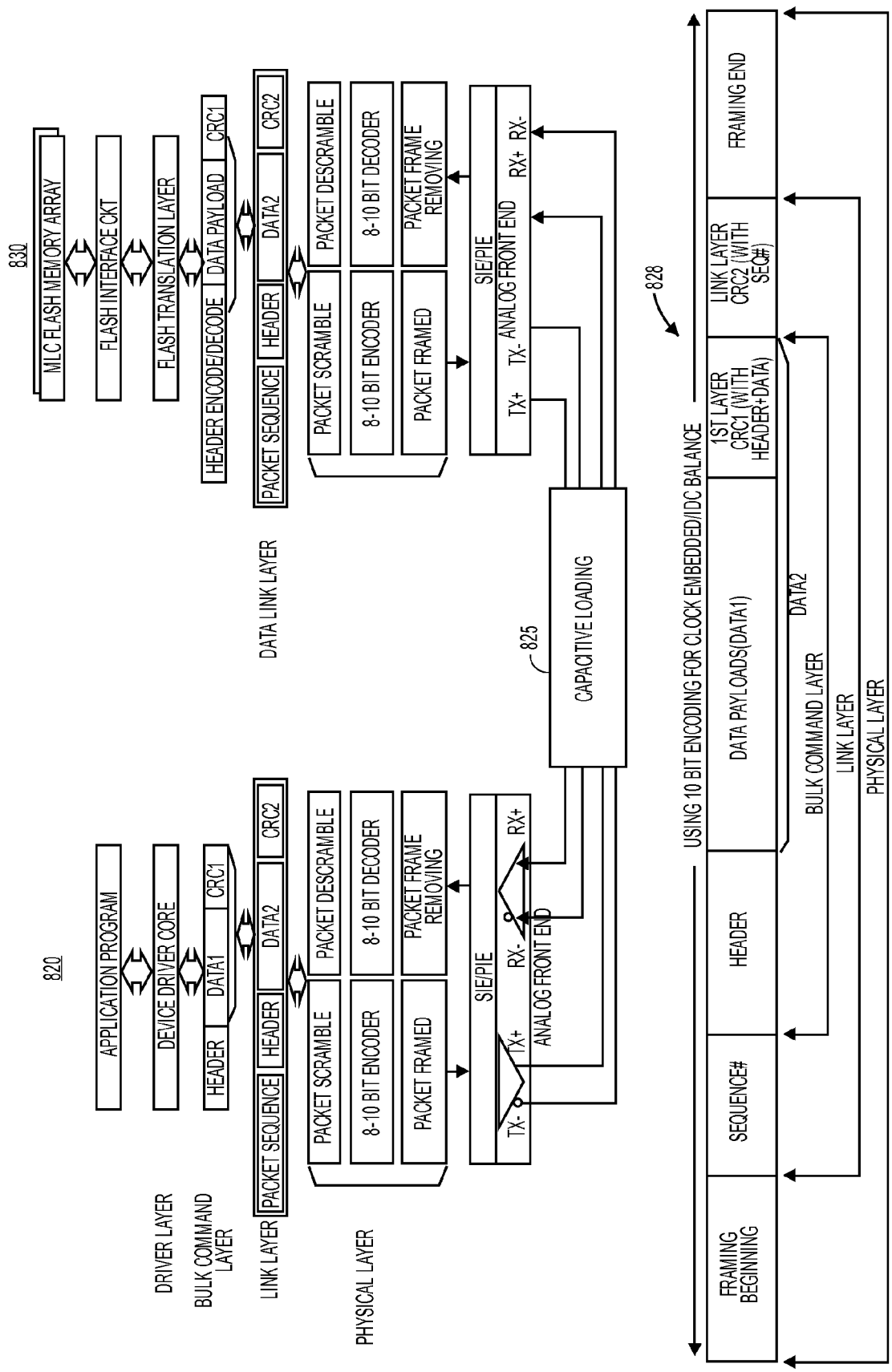

FIG. 10D is a block diagram illustrating packet forms used by an EUSB communication stack according to one embodiment of the invention. Referring to FIG. 10D, host 820 is communicatively coupled to an EUSB device 830 via an EUSB link 825, where the EUSB device 830 may be an EUSB endpoint device or an EUSB hub device. Both host 820 and EUSB device 830 include a communication stack similar to communication stack 840 of FIG. 10A, including an application layer, driver layer, a bulk command layer, data link layer, and a physical layer. An inbound physical layer includes a packet frame moving unit, 8/10 bit decoder, and a packet descrambler. An outbound physical layer includes a packet scrambler, 8/10 bit encoder, and a packet frame constructor. An example of an EUSB packet is shown as packet 828. The 8/10 bit conversion is used to balance logical zero and one within EUSB signals in an attempt to reduce DC (direct current) components of the signals, which leads to lower signal distortion.

Figure 11A:
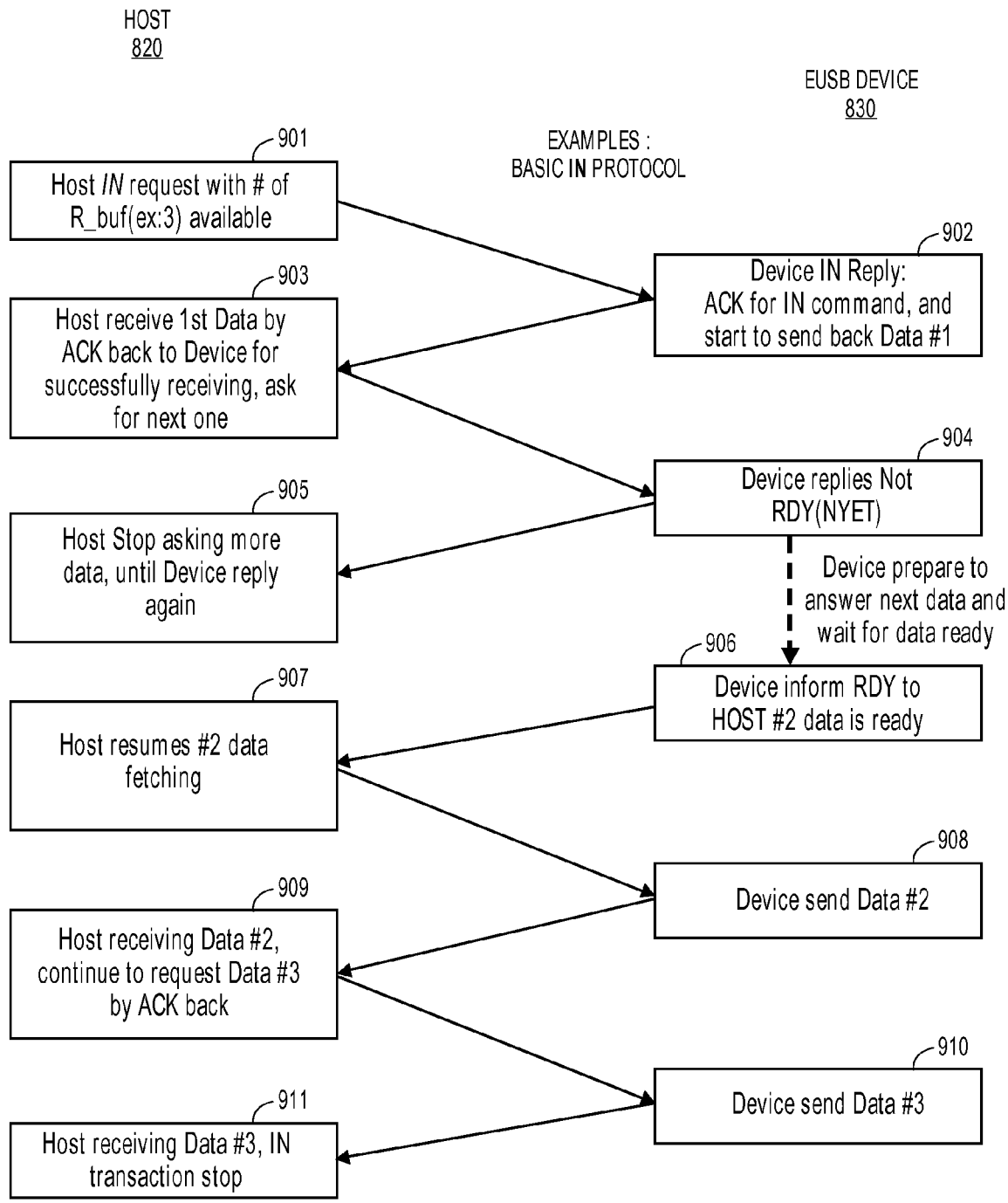
FIGS. 11A-11E are diagrams illustrating examples of communication protocols used with an EUSB system according to certain embodiments of the invention.

FIG. 11A is a flow diagram illustrating a process for an inbound transaction protocol according to one embodiment. Referring to FIG. 11A, at block 901, host 820 sends a request to USB device 830 for data by indicating the size of a receiving buffer available for receiving data. In response, at block 902, USB device 830 acknowledges the request and sends a first chunk of data to the host. At block 903, the host acknowledges the reception of the first chunk data. However, the USB device may not be ready for sending a next chunk of data. As a result, at block 904, USB device 830 sends a not ready command (e.g., NYET) to the host, which may suspend asking for more data at block 905. Subsequently, when the USB device 830 is ready, at block 906, the USB device sends a ready command to the host and in response, the host requests for a next block of data at block 907. In response to the request, at block 908, the USB device sends a next block of data, and so on during blocks 909-911.

Figure 11B:
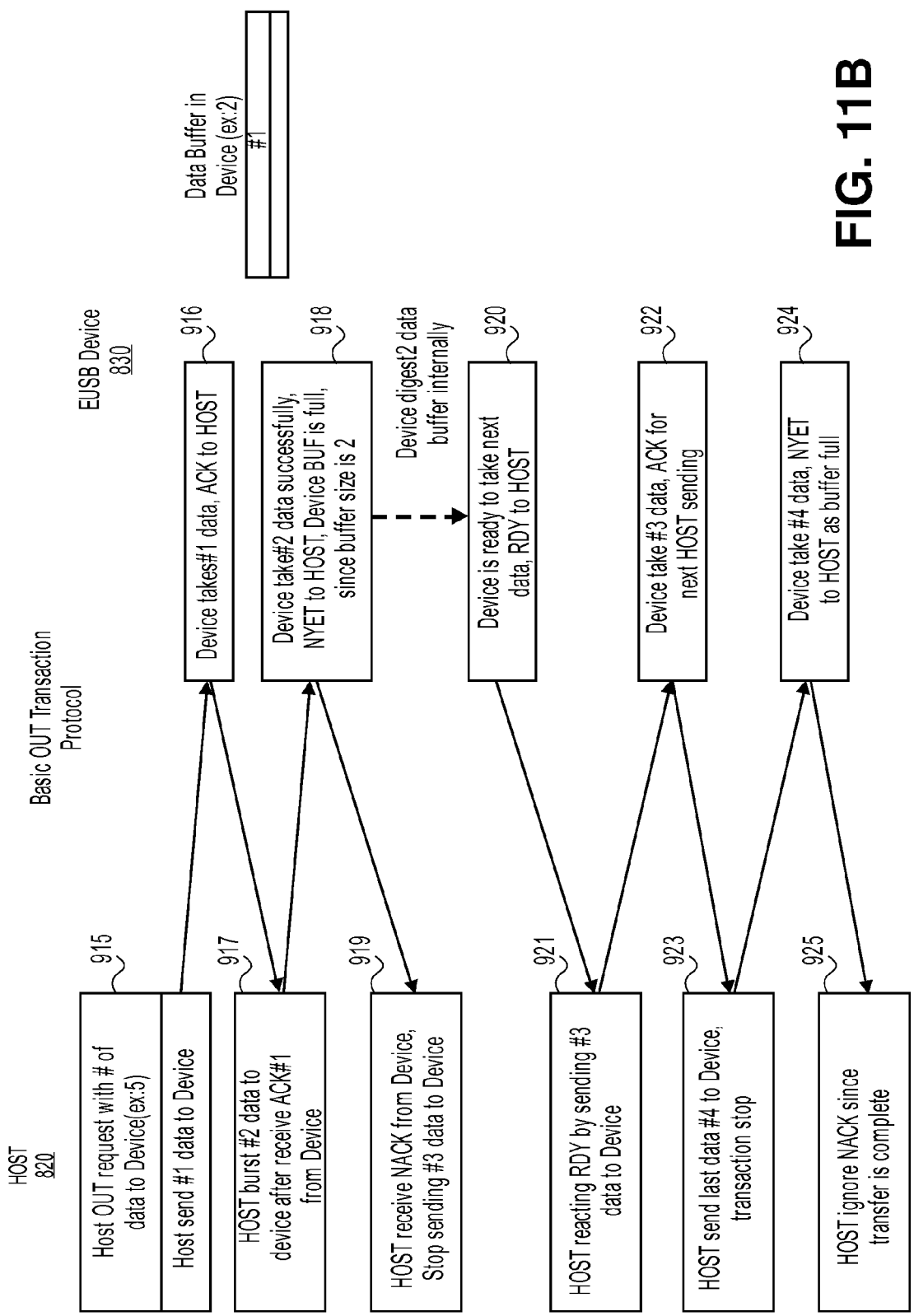

FIG. 11B is a flow diagram illustrating a process for an outbound transaction protocol according to one embodiment. Referring to FIG. 11B, after host 820 requests to sending amount of data to EUSB device 830, at block 915, the host sends a first block of data to the USB device, which at block 916, the USB device acknowledges the reception of the data. At block 917, the host sends a second block of data to the USBG device. However, the USB device is not ready to receive further data at the moment and instead, at block 918, the USB device notifies the host that its receiving buffer is full. In response, at block 919, the host suspends sending further data to the USB device. Subsequently, when the USB device is ready, at block 920, the USB device sends a signal indicating that the USB device is ready to receive further data and in response, at block 921, the host starts sending further data to the USB device, which is received by the USB device at block 922. At last, the host sends the last block of data to the USB device at block 923 and at block 914, the USB device may signal the host that the USB device is busy by sending a NYET command. However, at block 925, the host may ignore such a command since there is no more data to be sent.

Figure 11C:
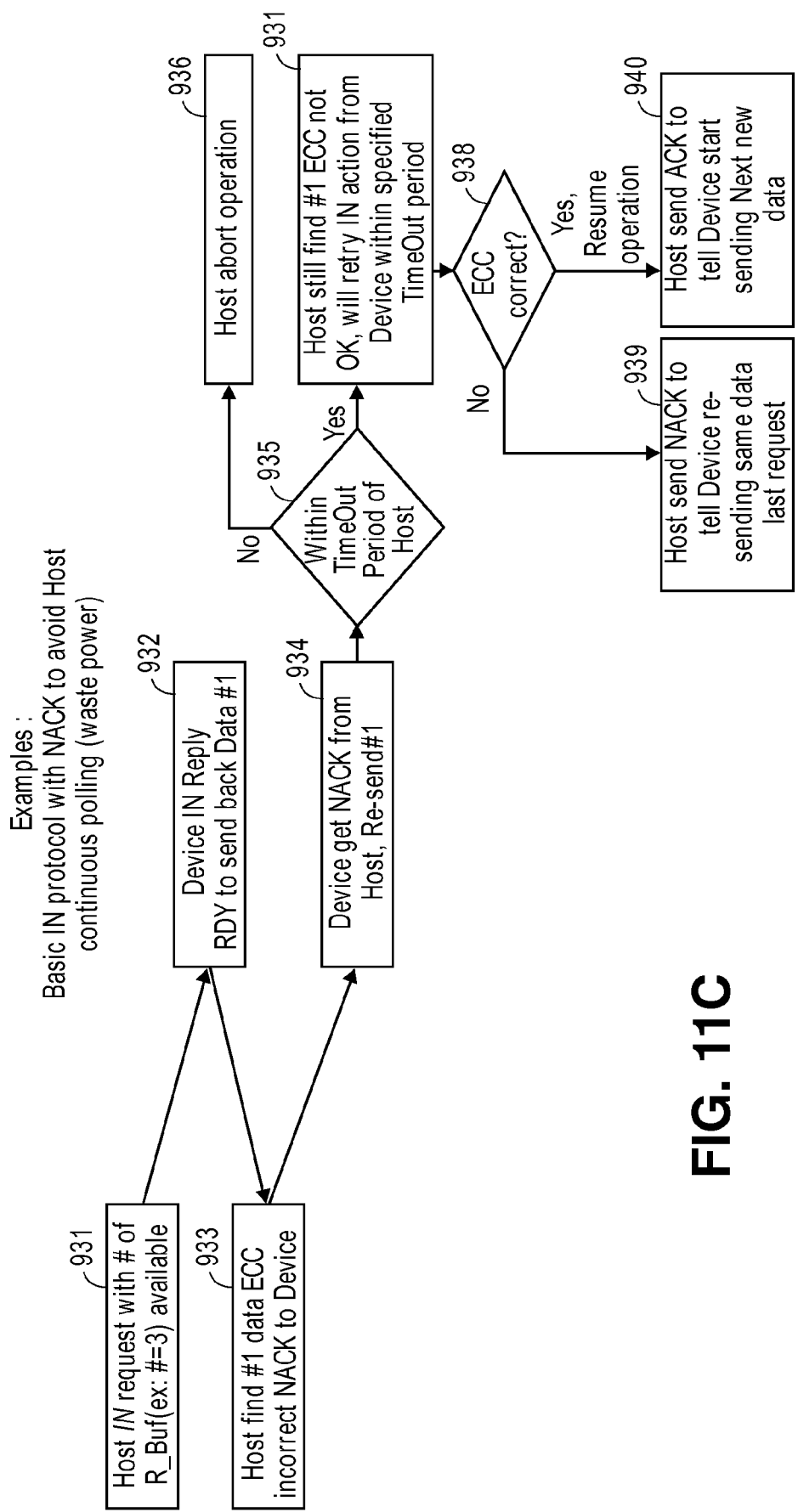

FIG. 11C is a block diagram illustrating a process for an inbound transaction protocol according to an alternative embodiment. Referring to FIG. 11C, at block 931, the host sends a request for receiving data from a USB device including indicating an availability of a receiving buffer. In response, at block 932, the USB device replies with a first block of data. In response to the data received from the USB device, at block 933, the host examines the integrity of the data packets (e.g., examination of error correction code or ECC) and in this example, an error exists. The host responds with a negative acknowledgment (NACK) to the USB device, which is received by the USB device at block 934. At block 935, the host checks whether it has been a while that the host has not received any further data by comparing against a predetermined host timeout period. If it exceeds the timeout period, at block 936, the host abandons the operations. Otherwise, at block 937, the host may retry the NACK message to the USB device. At block 938, if the subsequent data received has a correct ECC data, at block 940, the host acknowledges the USB device for further data. Otherwise, at block 939, the host responds with a NACK to ask the USB device to resend the same data.

Figure 11D:
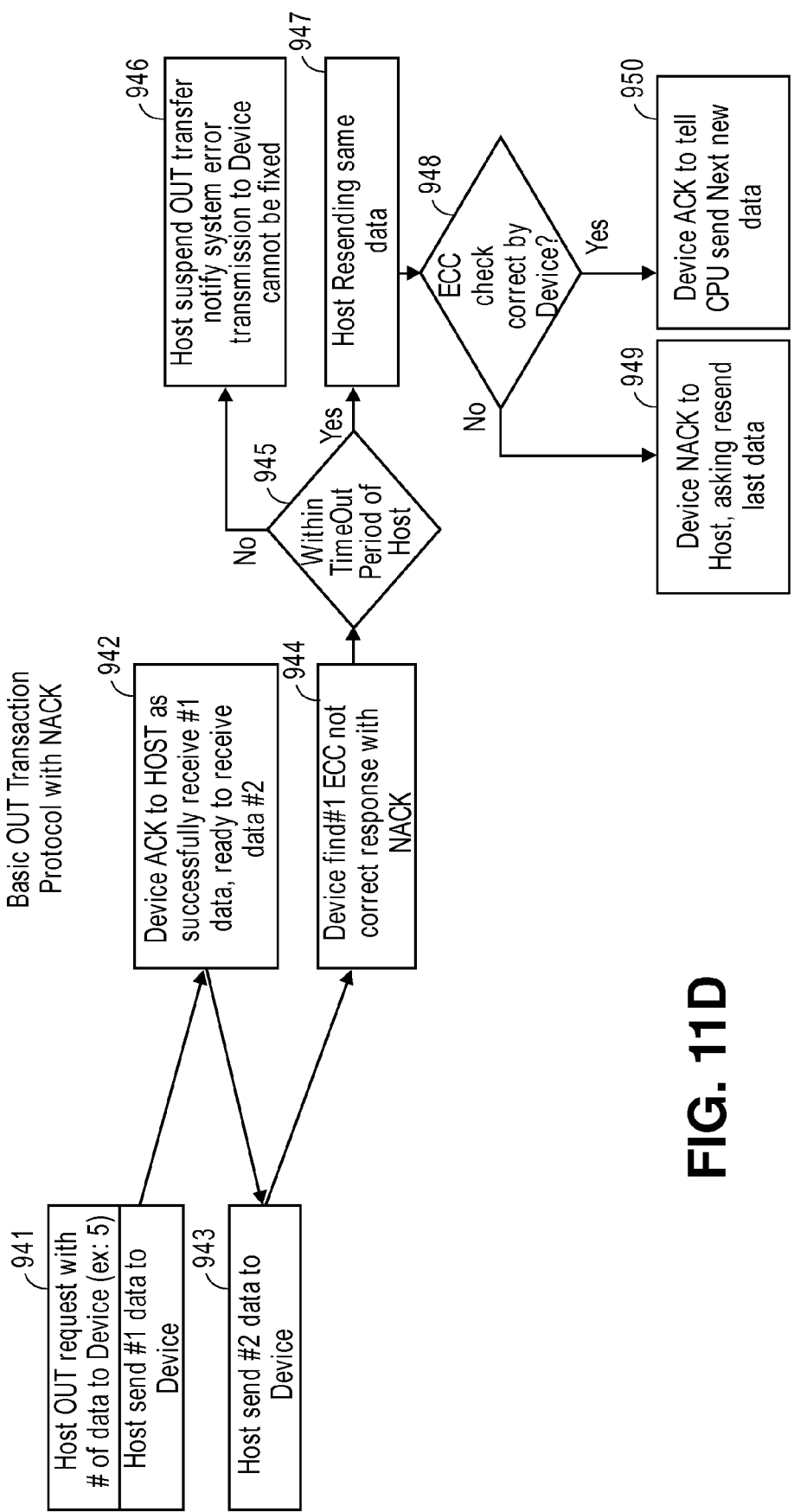
Figure 11E:
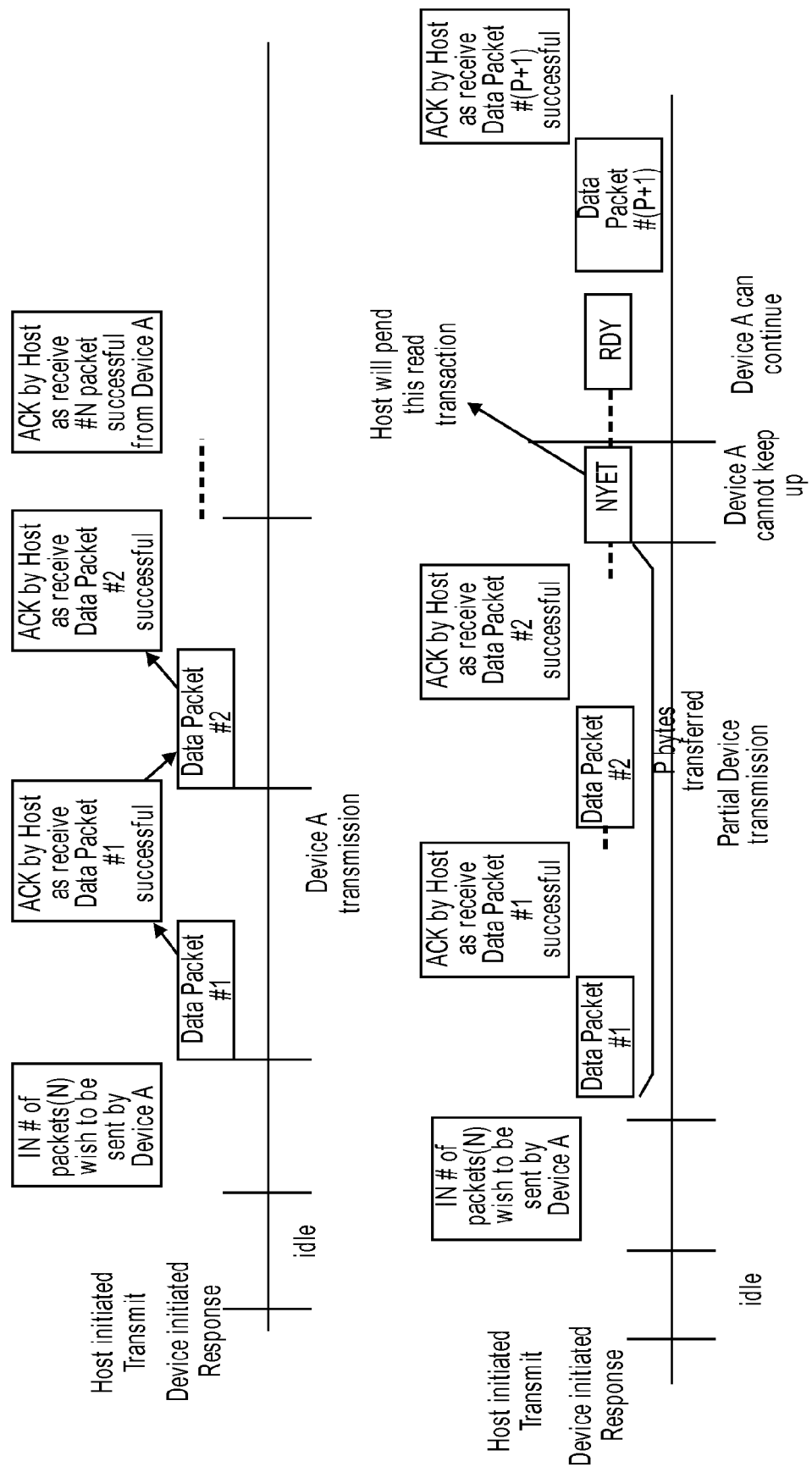
Figure 11E:
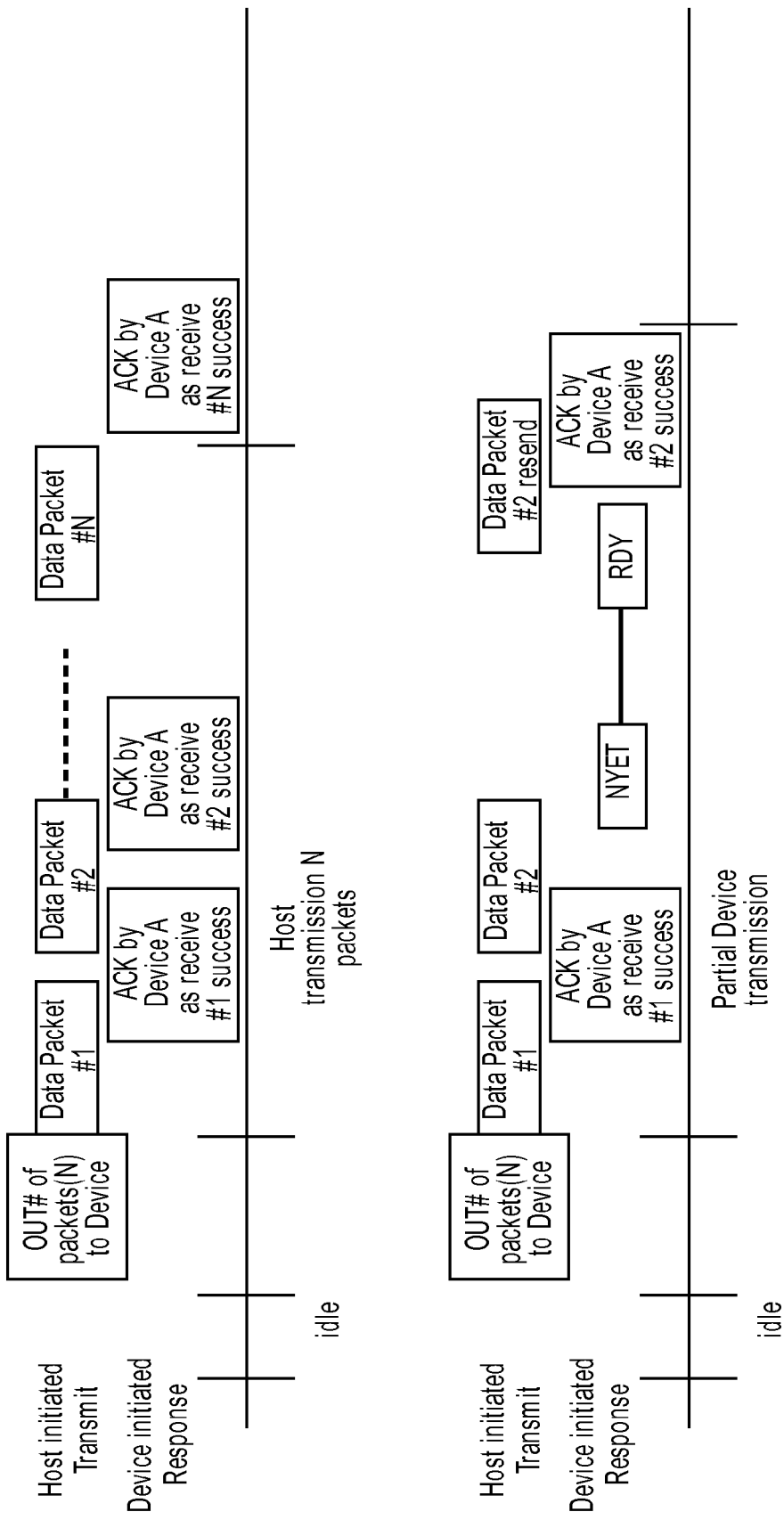
Figure 11E:
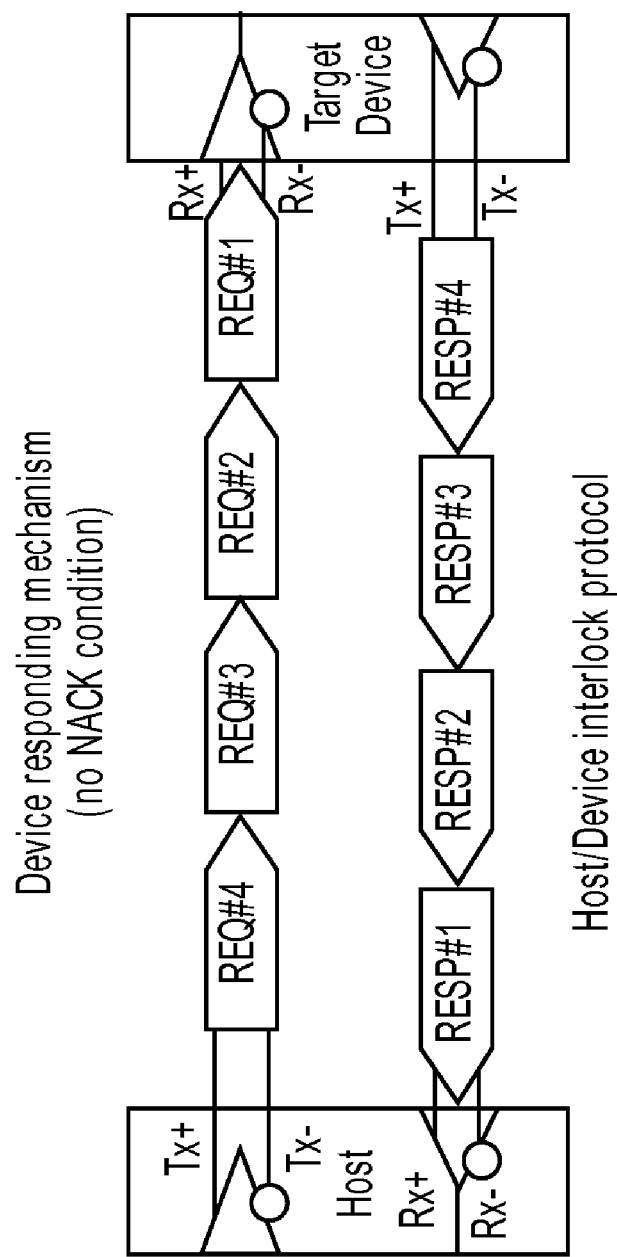

FIG. 11D is a block diagram illustrating a process for an outbound transaction protocol according to an alternative embodiment. Referring to FIG. 11D, at block 941, the host requests sending predetermined amount of data to the USB device and starts sending a first block of data, which is received by the USB device at block 942. Subsequently, at block 943, the host sends further data to the USB device, which at block 944, the USB device determines that the ECC is incorrect and thus sends a NACK back to the host. At block 945, the timeout is checked and if it is timed out, at block 946, the host suspends sending data out. If it is still within the timeout period, the host resends the same data at block 947 and ECC is checked at block 948. If the ECC is incorrect, at block 949, an NACK is sent back to the host; otherwise, at block 950, an ACK is sent to the host. FIG. 11E is a timeline diagram illustrating certain states with respect to operations involved in FIGS. 11A-11D.

According to one embodiment, an exemplary system includes one or more EUSB bus interfaces. System further includes an upstream path having upstream interface engine and an upstream controller. Similarly, system includes a downstream path having a downstream engine and a downstream controller. Upstream interface engine and downstream interface engine are used to handle EUSB protocols for the upstream and downstream paths respectively. Likewise, upstream controller and downstream controller are used to perform certain task associated with the EUSB protocols based on executable instructions stored in memory which may be a RAM or ROM. System further includes a processor for general-purpose operations and a DMA (direct memory access) engine for moving data without having to involve processor. Bus arbitrator is used to arbitrate an ownership of EUSB bus for the upstream path and/or downstream path. System further includes a set of configuration registers for configuring operations of the EUSB bus and a FIFO buffer for buffering the data. Note that some or all of these components may be implemented in software, hardware, or a combination of both.

Figure 12:
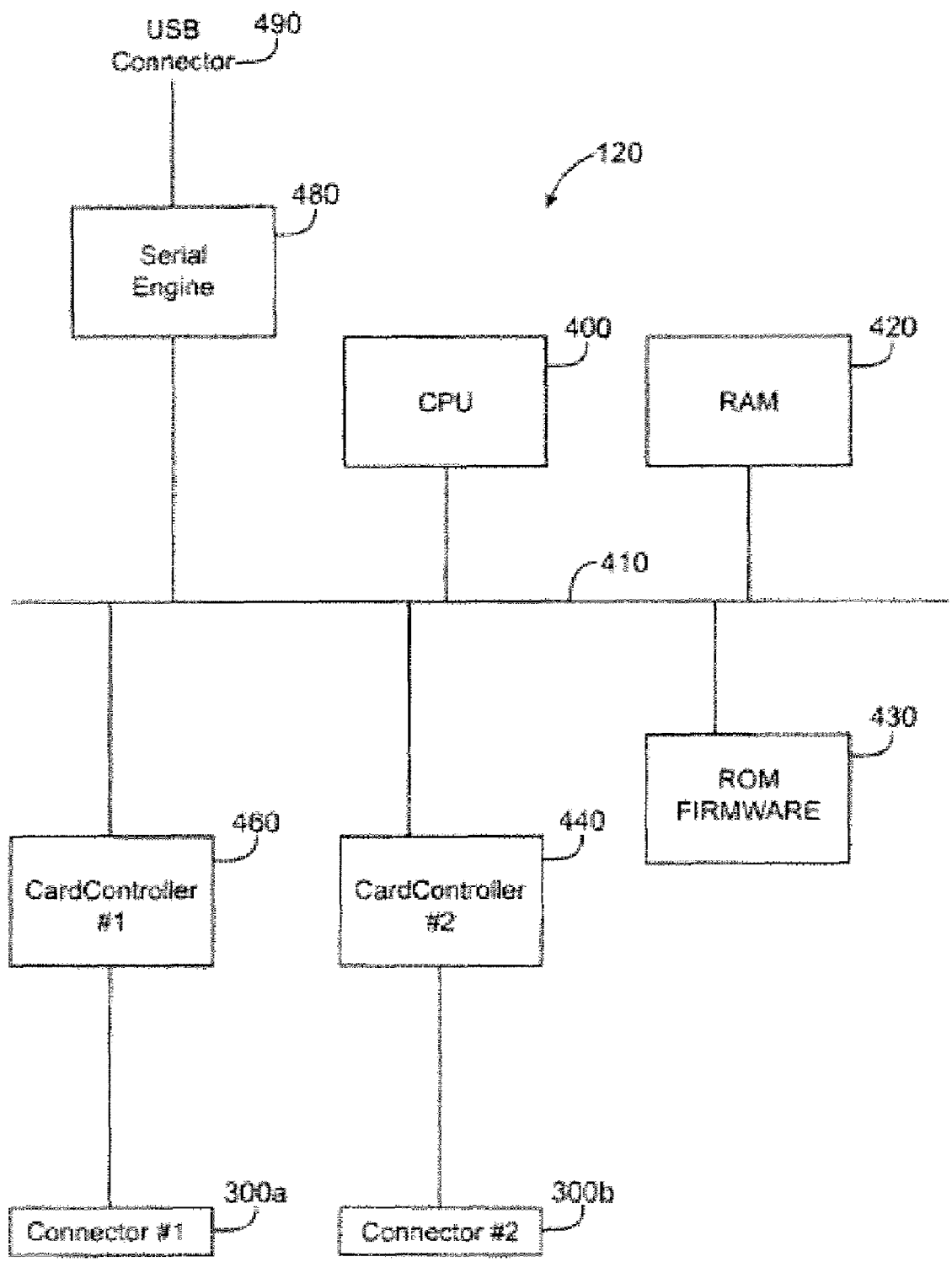
FIG. 12 is a block diagram illustrating an example of USB system according to one embodiment.

FIG. 12 is a block diagram illustrating an example of USB system according to one embodiment. Referring to FIG. 12, first portion 120 may include a first portion processor 400 coupled to a bus 410. A random access memory device 420 and a read only memory device 430 may be coupled to bus 410. A USB serial engine 480 may be coupled to bus 410 and include a USB connector 490. A pair of card controllers 440 and 460 may be coupled to bus 410 and include connectors 300a and 300b respectively. Card controllers 440 and 460 may include controllers adapted to interface with flash memory cards having different connections such as a proprietary connection, Multi Media Card (MMC), Secure Digital (SD) Card, Memory Stick (MS), Smart Media (SM), Compact Flash (CF), XD, PCI Express, Serial Advanced Technology Attachment (SATA), Serial Attached Small Computer System Interface (SCSI), and IEEE 1394. Although only two card controllers 440 and 460 are shown, those skilled in the art will appreciate that a plurality of card controllers may be coupled to bus 410.

Figure 13:
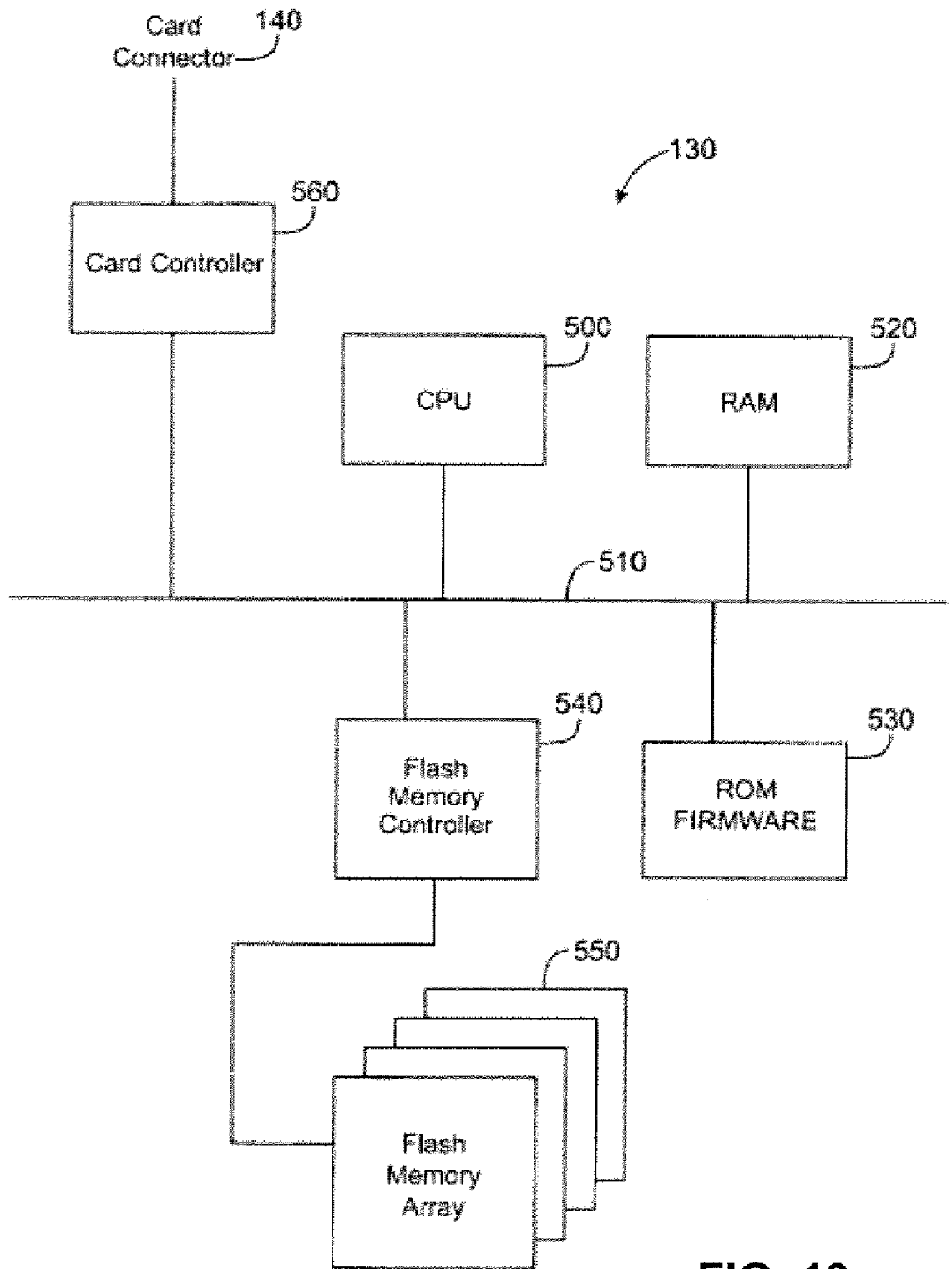
FIG. 13 is a block diagram illustrating an example of USB system according to one embodiment.

FIG. 13 is a block diagram illustrating an example of USB system according to one embodiment. Referring to FIG. 13, second portion 130 may include a second portion processor 500 coupled to a bus 510 as shown in FIG. 13. A random access memory device 520 and a read only memory device 530 may be coupled to bus 510. A flash memory controller 540 may be coupled to bus 510 and to a flash memory array 550. A card controller 560 may be coupled to bus 510 and to second portion connector 140.

Figure 14:
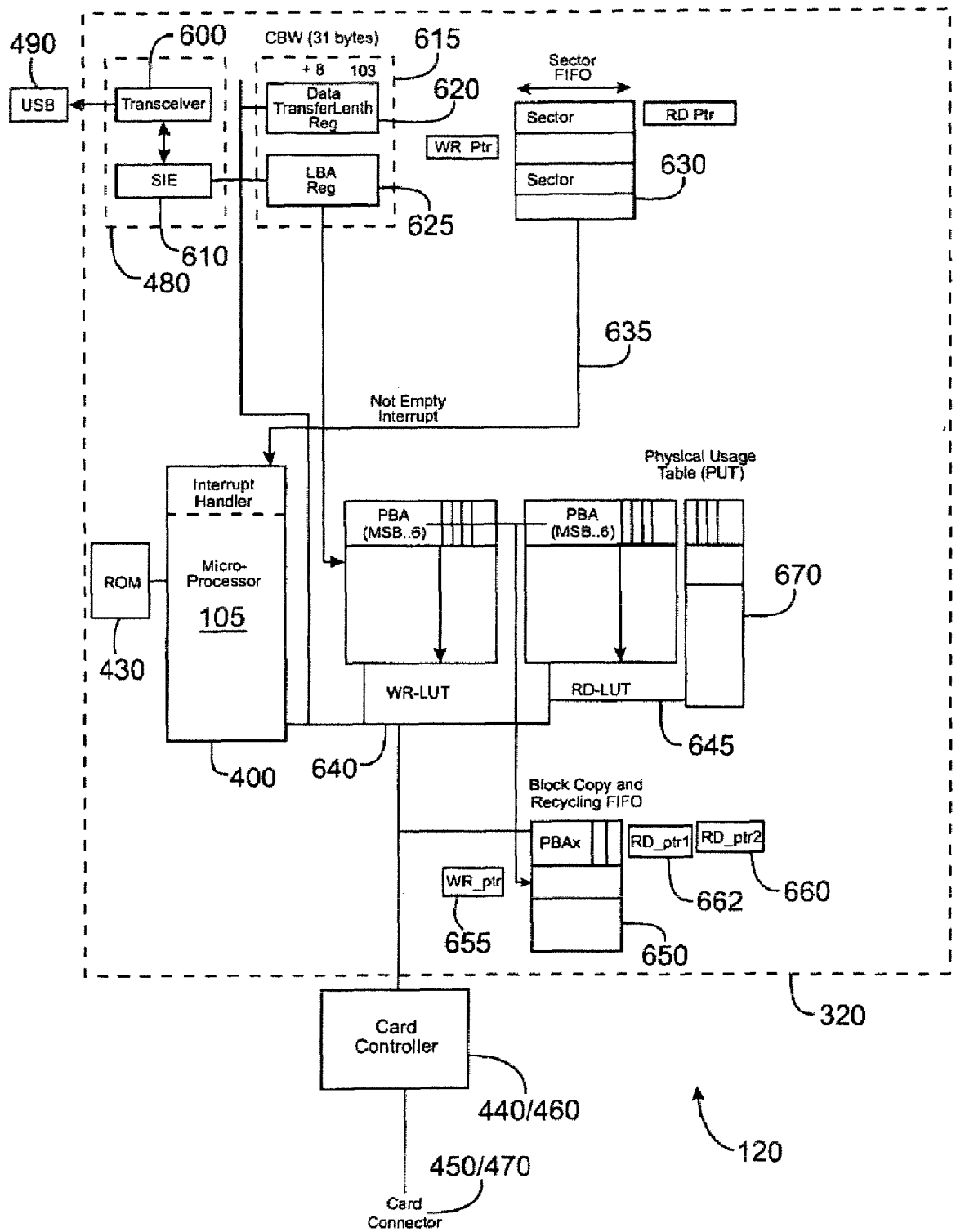
FIG. 14 is a block diagram illustrating an example of USB system according to one embodiment.

FIG. 14 is a block diagram illustrating an example of USB system according to one embodiment. Referring to FIG. 14, USB controller 320 may include serial engine 480 having a transceiver 600 operable to convert analog signals to digital streams and to provide a phase lock loop circuit for generating precision clocks for internal data latching. For USB 2.0, the phase lock loop functionality can be sensitive and thus useful due to its operating at 480 MHz. Serial engine 480 may also include a serial interface engine (SIE) 610 which may provide serial and parallel data conversion, packet decoding/generation, cyclic redundancy code (CRC) generation/checking, non-return-to-zero (NRZI) encoding/decoding, and bit stuffing according to the USB 2.0 standard.

A bulk-only transport unit (BOT) 615 may receive command block wrappers (CBW) and may include a data transfer length register 620 and a logical block address (LBA) register 625. A sector FIFO 630 may be used for data buffering. A FIFO-not-empty interrupt signal 635 may trigger an interrupt service routine at an interrupt handler of processor 400. The interrupt routine responds to the host system 110 confirming that a write process has been completed. In the mean time, processor 400 may execute firmware stored in ROM 430 to take care of sector data in FIFO 630 and execute the write process.

Microprocessor 400 may be an 8-bit or a 16-bit processor. Microprocessor 400 may be operable to respond to host system 110 requests and communicate with second portion 130 through card controller 440, 460. As firmware algorithms become more complicated, tradeoffs between performance and cost may determine the proper microprocessor selected.

In order to achieve logical to physical address translation, two look up tables may be used, write look up table 640 for write access and read look up table 645 for read access. Write look up table 640 and read look up table 645 provide an index or indexing scheme to flash memory array 550. A block copy and recycling FIFO 650 may be used with a write pointer 655 and two read pointers 660 and 662 assigned for block valid sector copy and erase operations. These two functions may share one FIFO mechanism to fulfill this purpose and may run in the background.

The physical usage table 670 may be used for physical sector mapping bookkeeping and may provide a bitmap indicating programmed sectors, that is, sectors to which data has already been written. Card controllers 440 and 460 may interface with second portion 130 to carry out commands from processor 400. Card controllers 440 and 460 may receive physical block addresses (PBAs) from write and read look up tables 640 and 645 respectively to service write and read requests. For optimal ASIC implementation, the write look up table 640, the read look up table 645, the physical usage table 670, and the recycling FIFO 650 may be implemented with volatile random access memory 420.

Figure 15A:
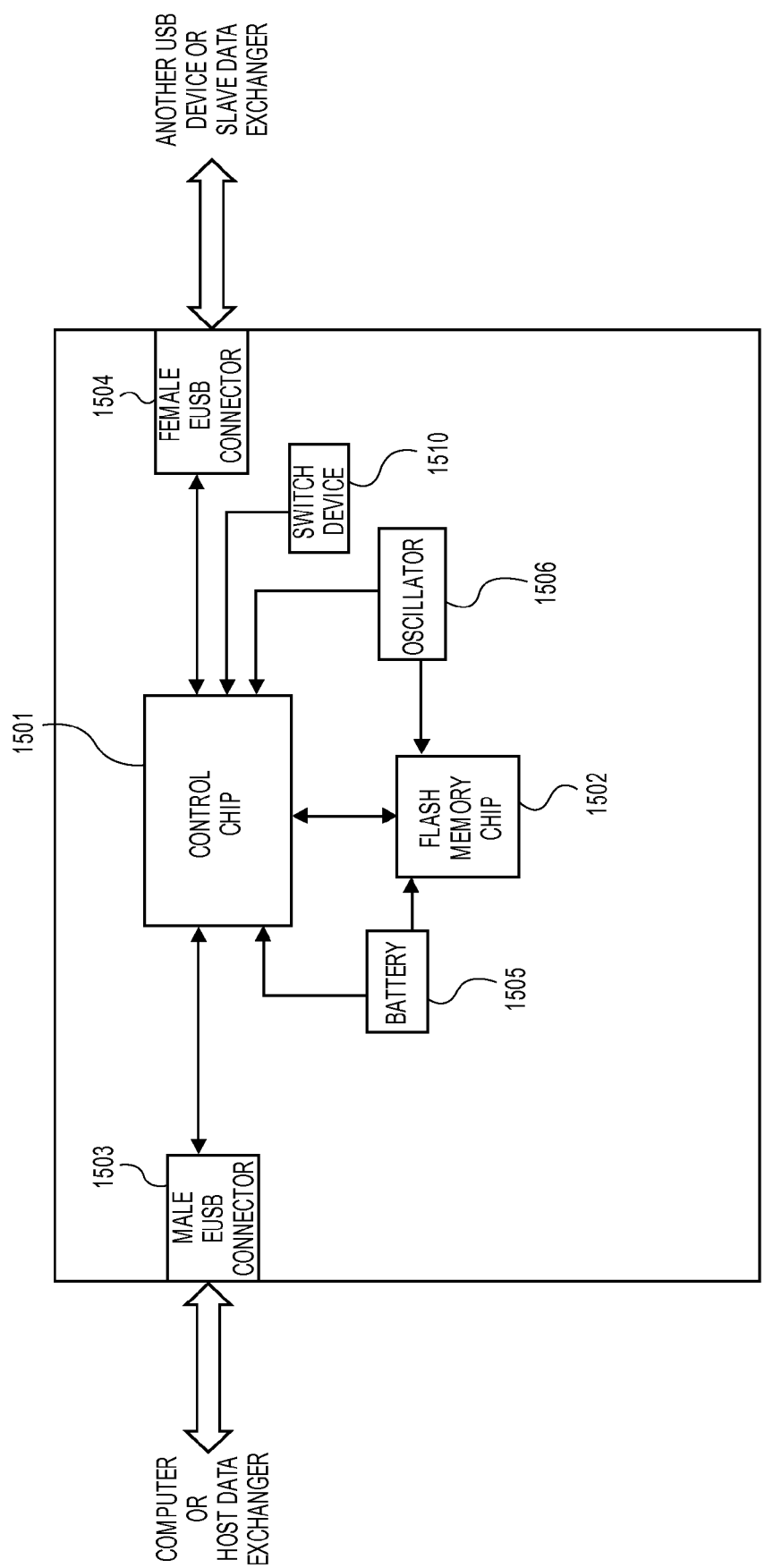
FIGS. 15A-15F are block diagrams illustrating various embodiments of data exchangers according to certain embodiments.

FIG. 15A is a block diagram illustrating a portable data exchanger having EUSB capability according to one embodiment. Referring to FIG. 15A, the portable data exchanger with extended USB interface of the present invention comprises: a controller chip 1501 having the USB on-the-go (OTG) capability, at least one flash memory chip 1502, an EUSB male connector 1503, an EUSB female connector 1504, at least one battery 1505, an oscillator 1506, and a switch device 1510, wherein the control chip 1501, flash memory chip 1502, EUSB male connector 1503, EUSB female connector 1504, oscillator 1506, switch device 1510, etc., are assembled to a printed circuit board (PCB) to form a printed circuit board assembly.

In this embodiment, as the portable data exchanger with extended USB interface has the EUSB female connector 1504 and a power supply—the battery 1505, and as the controller chip 1501 thereof has the USB OTG capability, the portable data exchanger with extended USB interface can exchange data with another portable data exchanger with extended USB interface of the same design connected thereto without using a computer. When the EUSB male connector 3 of the portable data exchanger with extended USB interface is connected to the female connector 1504 of another portable data exchanger with extended USB interface of the same design, the portable data exchanger with extended USB interface initially plays the role of slave, and another portable data exchanger with extended USB interface initially plays the roles of host, for example, via pressing down a buttons attached thereon. When the EUSB male connector 1503 of another portable data exchanger with extended USB interface is connected to the female connector 1504 of the portable data exchanger with extended USB interface, the portable data exchanger with extended USB interface initially plays the role of host, and another portable data exchanger with extended USB interface initially plays the roles of slave, via pressing down corresponding buttons of them.

The USB OTG includes a Host Negotiation Protocol (HNP). HNP allows two devices to exchange their host/slave roles, provide both are OTG devices. USB OTG defines two roles of devices: OTG A-device and OTG B-device. This terminology defines which side supplies power to the link, and which is initially the host. The OTG A-device is a power supplier, and an OTG B-device is a power consumer. The default link configuration is that A-device is a host and B-device is a slave. The host and slave modes may be exchanged later by using HNP.

Therefore, the portable data exchanger with extended USB interfaces of the present invention can exchange their host/slave roles later no matter what default roles they are initially. The portable data exchanger with extended USB interfaces of the present invention can exchange data with each other without using a computer. For example, the portable data exchanger with extended USB interfaces of the present invention can replace advertisement catalogs in a commercial exhibition or papers in a seminar to exchange data in situ, saving time, paper, and internet bandwidth.

USB OTG devices are backward compliant with USB 2.0 and will behave as standard USB hosts or slaves when connected to standard (no OTG) USB devices. However, OTG hosts are only required to provide a small amount of power, which may not be enough to connect to a non-OTG peripheral. This can sometimes be solved by connecting to the non-OTG peripheral through an externally powered hub if that OTG host supports hubs. (Such a support is not required by the standard USB OTG.)

Therefore, the portable data exchanger with extended USB interface of the present invention is designed to have the hub-supporting USB OTG capability. Thus, the portable data exchanger with extended USB interface of the present invention not only can function as a slave to be controlled by a standard non-OTG USB host device but also can function as a host to control a standard non-OTG USB peripheral device or initiate data exchange with a standard OTG USB peripheral device.

Further, the portable data exchanger with extended USB interface of the present invention may further comprises at least one LED 12 (Light Emitting Diode), which is used to indicate various states of the data exchanger.

Furthermore, the portable data exchanger with extended USB interface of the present invention may further comprises an LCD (Liquid Crystal Display) (not shown in the drawing), which can present the related information, such as the states, or the operating commands.

Moreover, the portable data exchanger with extended USB interface may be designed to exchange only an authentication code with another portable data exchanger with extended USB interface or compatible devices, and a user can use the authentication code to access data via the Internet.

Figure 15B:
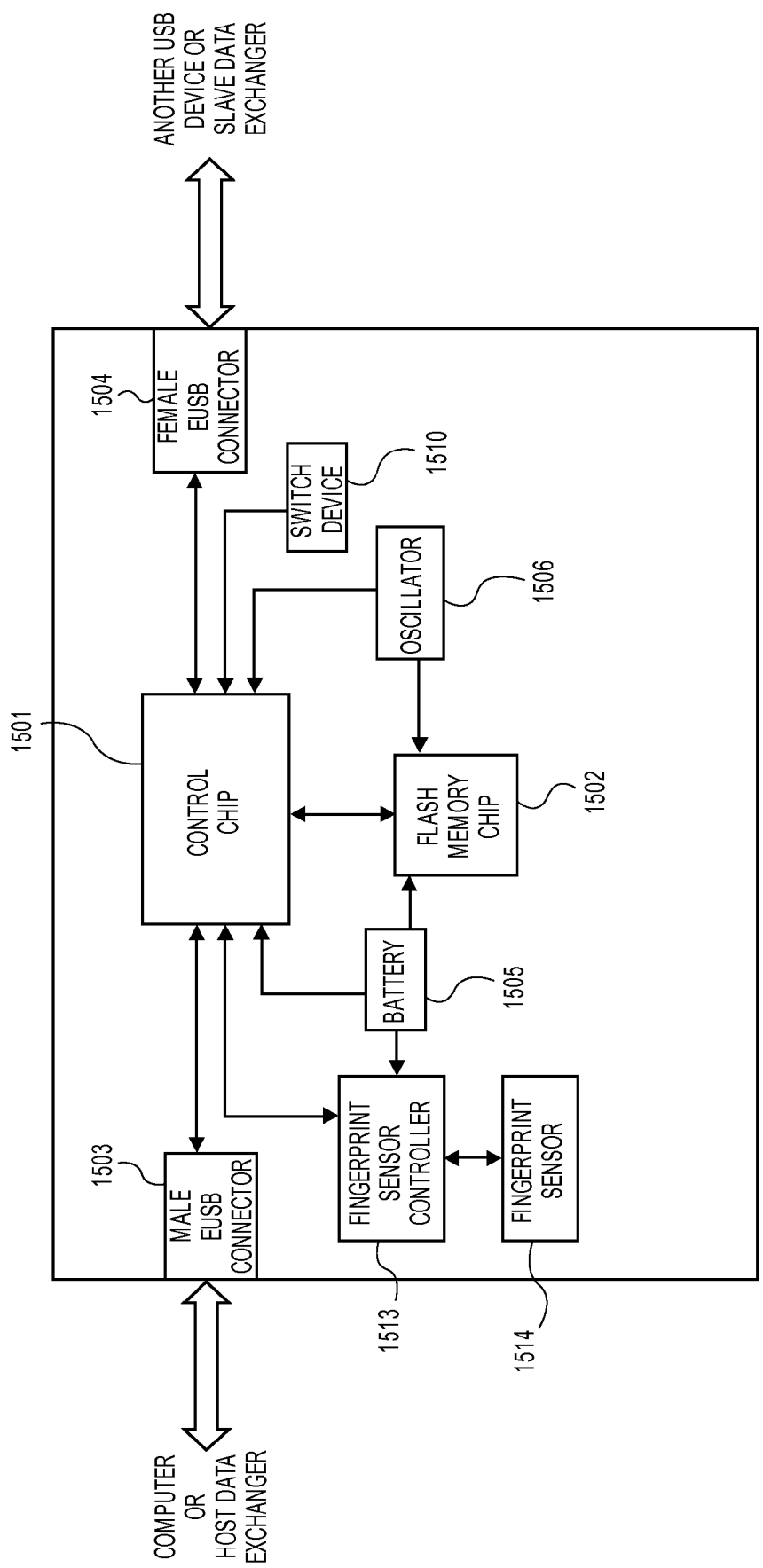

FIG. 15B is a block diagram illustrating an alternative embodiment of an EUSB system. In addition to those components as shown in FIG. 15A, system as shown in FIG. 15B further includes a fingerprint sensor controller 1513 and a fingerprint sensor 1514. In this embodiment, the fingerprint sensor controller 1513 can store at least one set of fingerprint. A user can press one of his fingers onto the fingerprint sensor 1514 to input his fingerprint, and the fingerprint will be stored in the fingerprint sensor controller 1513 as an authentication fingerprint. When a user intending to use the data exchanger presses down the button 1511, he will be required to input his fingerprint. After the user inputs his fingerprint via the fingerprint sensor 1514, the fingerprint sensor controller 1513 compares the input fingerprint with the authentication fingerprints stored therein. If the authentication result is positive, the fingerprint sensor controller 1513 will notify the controller chip 1501 to start. In this embodiment, the fingerprint sensor controller 1513 may be incorporated with the controller chip 1501 to form a single control chip.

Figure 15C:
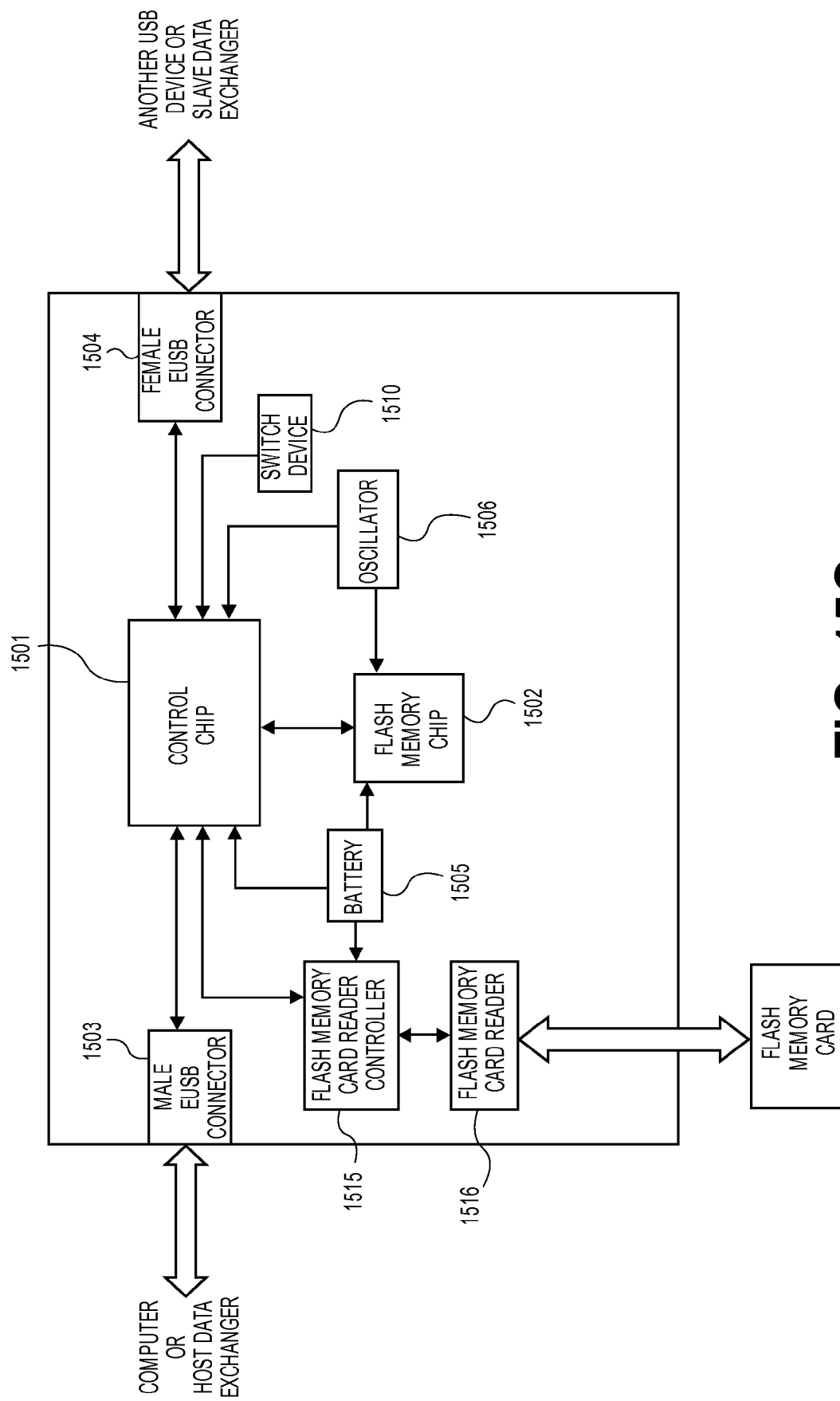

FIG. 15C is a block diagram illustrating an alternative embodiment of an EUSB system. In addition to those components as shown in FIG. 15A, system as shown in FIG. 15C further includes a flash memory card reader controller 1515 coupled to a flash memory card reader 1516. In this embodiment, since the portable data exchanger with extended USB interface has a card reader, external flash memory cards can thus function as the spare memories of the built-in flash memory chip 1502. Then, the memory capacity of the portable data exchanger with extended USB interface can be easily expanded. Further, different data can be classified and stored in different external flash memory cards. In this embodiment, the USB flash memory card reader controller 1515 may be incorporated with the controller chip 1501 to form a single control chip.

Figure 15D:
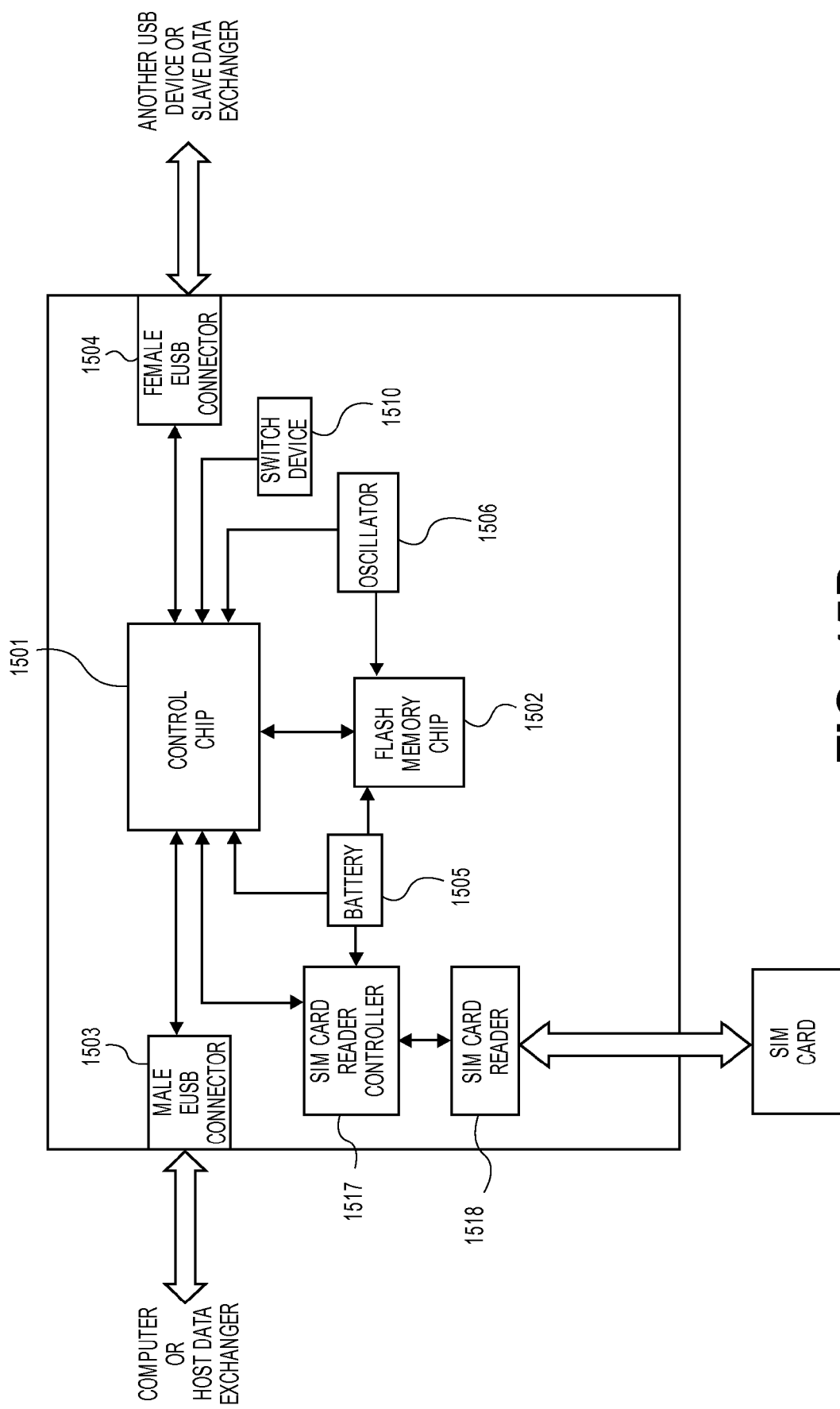

FIG. 15D is a block diagram illustrating an alternative embodiment of an EUSB system. In addition to those components as shown in FIG. 15A, system as shown in FIG. 15D further includes a SIM card reader controller 1517 coupled to a SIM card reader 1518. In this embodiment, the portable data exchanger with extended USB interface may be designed to check personal identity with a SIM card, and only a positive identification can start the portable data exchanger with extended USB interface. In this embodiment, the USB SIM card reader controller 1517 may be incorporated with the controller chip 1501 to form a single control chip.

Figure 15E:
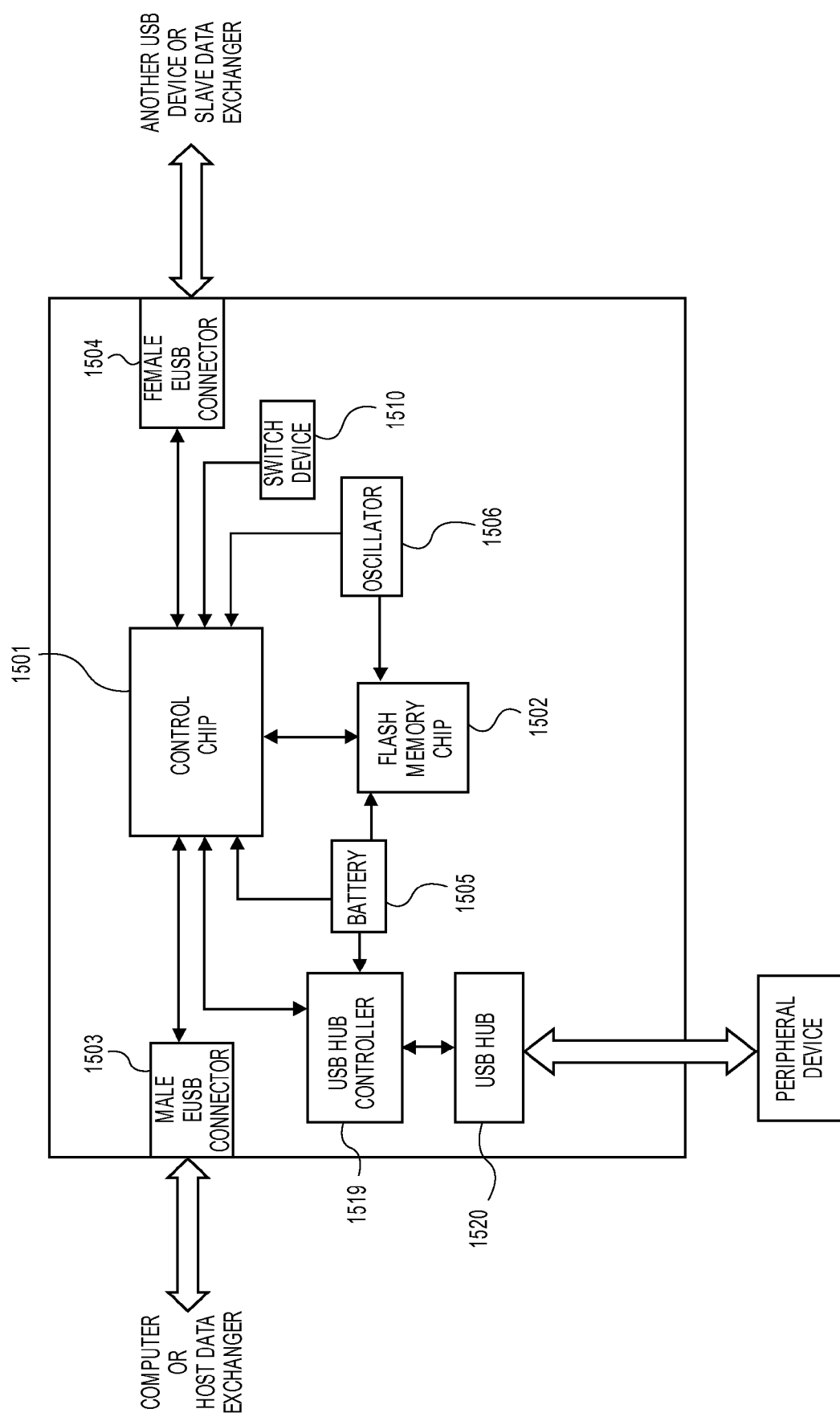

FIG. 15E is a block diagram illustrating an alternative embodiment of an EUSB system. In addition to those components as shown in FIG. 15A, system as shown in FIG. 15E further includes a USB hub controller 1519 coupled to a USB hub device 1520. In this embodiment, the USB hub controller 1519 may be incorporated with the controller chip 1501 to form a single control chip.

Figure 15F:
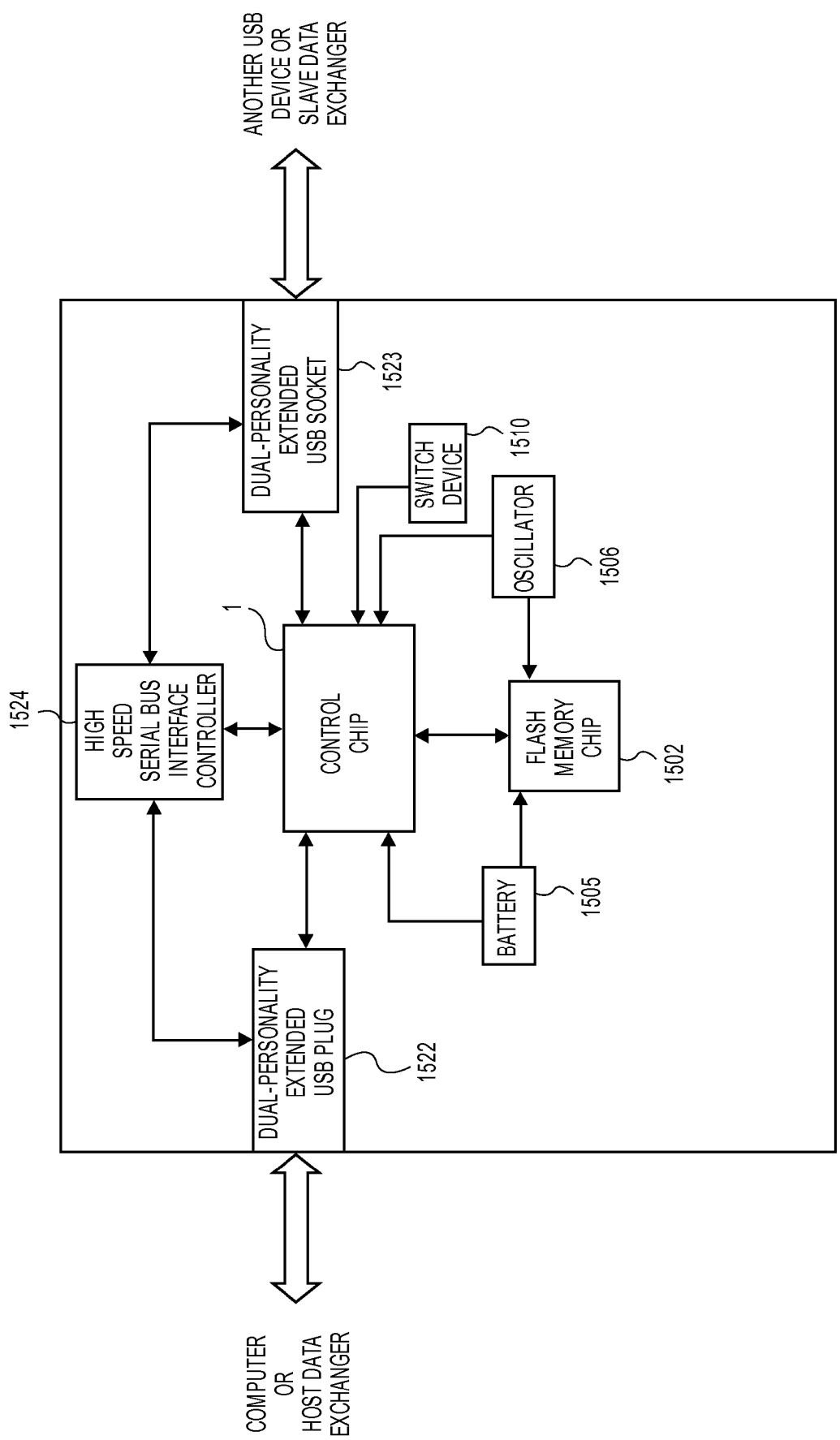

FIG. 15F is a block diagram illustrating an alternative embodiment of an EUSB system. Similar to those components as shown in FIG. 15A, system as shown in FIG. 15F further includes a high speed serial bus interface controller 1524 for handling communication between a dual personality EUSB plug 1522 and a dual personality EUSB socket 1523.

Each of the abovementioned extended USB plug 1522 and socket 1523 has a pin substrate with one surface that supports the four metal contact pins for the standard USB interface. Each of the extensions of the pin substrates of the plug and socket carries another 8 extension metal contact pins. The extension metal contact pins of the plug and socket mate each other when both the plug and socket are extended. The extension can be an increased length of the plug's and socket's pin substrate or the reverse side of the substrate. Standard USB connectors do not make contact with the extension metal contacts that are recessed or retracted by a mechanical switch, or on the extension of the socket's pin substrate that a standard USB connector cannot reach. Standard USB socket do not make contact with the extension because the extended connector's extension contacts are recessed, or on the extension of the connector pin substrate that does not fit inside a standard USB socket.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description below. In addition, embodiments of the present invention are not described with reference to any particular programming language. It will be appreciated that a variety of programming languages may be used to implement the teachings of embodiments of the invention as described herein.

A machine-readable medium may include any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A portable universal serial bus (USB) data exchanger device, comprising:
   at least one flash memory chip having a multi-level cell (MLC) memory array;
   a flash memory controller coupled to the at least one flash memory chip, the flash memory controller having a USB on-the-go (OTG) capability and controlling reading and writing of the flash memory chip;
   a first EXTENDED USB (EUSB) connector coupled to the flash memory controller to be coupled to an external host;
   a second EUSB connector coupled to the flash memory controller to be coupled to a slave USB device, wherein the flash memory controller having the OTG capability enables the portable USB data exchanger to operate as at least one of a USB storage device having the at least one flash memory chip attached therein with respect to the external host via the first EUSB connector and a host with respect to the slave USB device coupled to the second EUSB connector,
   wherein the flash memory controller is configured to communicate with the external host via the first EUSB connector when operating as a USB storage device without having the external host to poll the portable USB data exchanger in order to determine an operating status of the portable USB data exchanger,
   wherein the flash memory controller is configured to communicate with a slave USB device when operating as a host via the second EUSB connector without having the portable USB data exchanger to poll the slave USB device in order to determine an operating status of the slave USB device, and
   wherein the flash memory controller is configured to
      enable a host to send a request to a USB device for receiving predetermined blocks of data from the USB device,
      in response to the request, enable the USB device to reply with a positive acknowledgement (ACK) and to send a first block of data to the host,
      in response to the first block of data received from the USB device, enable the host to request a next block of data,
      if the USB device is not ready, the USB device is to reply with a negative acknowledgement (NACK) indicating that the USB device is not ready to send further data,
      in response to the NACK, enable the host to suspend requesting for further data,
      subsequently when the USB device is ready, enable the USB device to send a ready signal (RDY) to the host indicating that the USB device is ready to send further data, and
      enable the host to reply an ACK to the USB device to receive further data until all of the predetermined blocks of data have been received,
   wherein the portable data exchanger is capable of operating as at least one of a host and a slave USB device,
   wherein when the portable data exchanger operates as a slave USB device, the host is an external host coupled to the first EUSB connector and the USB device is part of the portable data exchanger having at least one flash memory chip, and
   wherein when the portable data exchanger operates as a slave USB device, the host is part of the portable USB data exchanger and the USB device is an external slave USB device coupled to the second EUSB connector.

2. The device of claim 1, wherein the flash memory controller is further configured to:
   enable the host to examine an error correction code (ECC) associated with a third block of data received from the USB device; and
   if the ECC is incorrect, enable the host to send an NACK to the USB device requesting resending the third block of data from the USB device.

3. The device of claim 2, wherein the flash memory controller is further configured to:
   enable the host to suspend operations related to receiving data from the USB device in an attempt to wait for the third block of data to be resent;
   enable the host to periodically determine whether the suspension has exceeded a predetermined period of time; and enable the host to abort the operations to receiving further data from the USB device if the suspension has exceeded the predetermined period of time.

4. The device of claim 3, wherein the flash memory controller is further configured to enable the host to retry receiving the third block of data from the USB device if the suspension has not exceeded the predetermined period of time.

5. The device of claim 1, wherein the device is implemented in one of a plurality of mechanical form factors, including at least one of Secure-Digital, Multi-media Card, Micro Secure-Digital, or Memory Stick card.

6. A portable universal serial bus (USB) data exchanger device, comprising:
  at least one flash memory chip having a multi-level cell (MLC) memory array;
  a flash memory controller coupled to the at least one flash memory chip, the flash memory controller having a USB on-the-go (OTG) capability and controlling reading and writing of the flash memory chip;
  a first EXTENDED USB (EUSB) connector coupled to the flash memory controller to be coupled to an external host;
  a second EUSB connector coupled to the flash memory controller to be coupled to a slave USB device, wherein the flash memory controller having the OTG capability enables the portable USB data exchanger to operate as at least one of a USB storage device having the at least one flash memory chip attached therein with respect to the external host via the first EUSB connector and a host with respect to the slave USB device coupled to the second EUSB connector,
  wherein the flash memory controller is configured to communicate with the external host via the first EUSB connector when operating as a USB storage device without having the external host to poll the portable USB data exchanger in order to determine an operating status of the portable USB data exchanger,
  wherein the flash memory controller is configured to communicate with a slave USB device when operating as a host via the second EUSB connector without having the portable USB data exchanger to poll the slave USB device in order to determine an operating status of the slave USB device, and
  wherein the flash memory controller is configured to
    enable a host to send a request to a USB device for sending a predetermined blocks of data to the USB device,
    enable the host to start sending a first block of data to the USB device,
    enable the USB device to reply with a positive acknowledgement (ACK) to the host, indicating that the first block of data has been successfully received,
    in response to the ACK, enable the host to send a second block of data to the USB device,
    if a receiving buffer is full, enable the USB device to send a negative acknowledgement (NACK) to the host indicating that the USB device is not ready to receive further data,
    in response to the NACK, enable the host to suspend sending further data to the USB device,
    subsequently when the USB device is ready to receive further data from the host, enable the USB device to send a ready (RDY) signal to the host, and
    in response to the RDY signal, enable the host to send further data to USB device until all of the predetermined blocks of data have been sent to the USB device,
  wherein the portable data exchanger is capable of operating as at least one of a host and a slave USB device,
  wherein when the portable data exchanger operates as a slave USB device, the host is an external host coupled to the first EUSB connector and the USB device is part of the portable data exchanger having at least one flash memory chip, and
  wherein when the portable data exchanger operates as a slave USB device, the host is part of the portable USB data exchanger and the USB device is an external slave USB device coupled to the second EUSB connector.

7. The device of claim 6, wherein the flash memory controller is configured to:
  enable the USB device to examine an error correction code (ECC) associated with a third block of data received from the host; and
  if the ECC is incorrect, enable the USB device to send an NACK to the host requesting resending the third block of data from the host.

8. The device of claim 7, wherein the flash memory controller is configured to:
  enable the host to resend the third block of data;
  enable the host to periodically determine whether resending of the third block of data has been successfully performed within a predetermined period of time; and
  enable the host to abort the operations to send resend the third block of data to the USB device if the suspension has exceeded the predetermined period of time lapses.

9. The device of claim 8, wherein the flash memory controller is configured to enable the host to retry sending the third block of data to the USB device if the predetermined period of time has not lapsed.

10. The device of claim 6, wherein the device is implemented in one of a plurality of mechanical form factors, including at least one of Secure-Digital, Multi-media Card, Micro Secure-Digital, or Memory Stick card.

* * * * *